US012811759B2

(12) United States Patent
Bhamri et al.

(10) Patent No.: US 12,811,759 B2
(45) Date of Patent: Nov. 24, 2026

(54) RADIO-BASED SENSING IN A RADIO ACCESS NETWORK

(71) Applicant: Lenovo (Singapore) Pte. Ltd., New Tech Park (SG)

(72) Inventors: Ankit Bhamri, Rödermark (DE); Ali Ramadan Ali, Kraiburg am Inn (DE); Sher Ali Cheema, Ilmenau (DE); Karthikeyan Ganesan, Kronberg im Taunus (DE); Robin Thomas, Bad Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 332 days.

(21) Appl. No.: 18/256,622

(22) PCT Filed: Dec. 8, 2021

(86) PCT No.: PCT/IB2021/061464
§ 371 (c)(1),
(2) Date: Jun. 8, 2023

(87) PCT Pub. No.: WO2022/123460
PCT Pub. Date: Jun. 16, 2022

(65) Prior Publication Data

US 2024/0022386 A1 Jan. 18, 2024

Related U.S. Application Data

(60) Provisional application No. 63/122,922, filed on Dec. 8, 2020.

(51) Int. Cl.
*H04L 5/00* (2006.01)
*G01S 7/00* (2006.01)
(Continued)

(52) U.S. Cl.
CPC ............ *H04L 5/0098* (2013.01); *G01S 7/006* (2013.01); *H04L 5/14* (2013.01); *G01S 13/003* (2013.01)

(58) Field of Classification Search
CPC ....... H04L 5/0098; H04L 5/14; H04L 5/0091; H04L 5/0053; G01S 7/006; G01S 13/003
(Continued)

(56) References Cited

U.S. PATENT DOCUMENTS

2013/0223398 A1* 8/2013 Li ........................ H04W 72/542 370/329
2019/0349180 A1* 11/2019 Lu ........................ H04L 27/2607
(Continued)

FOREIGN PATENT DOCUMENTS

WO 2020100787 A1 5/2020

OTHER PUBLICATIONS

PCT/IB2021/061464, "Notification of Transmittal of the International Search Report and the Written Opinion of the International Searching Authority, or the Declaration", International Searching Authority, Apr. 4, 2022, pp. 1-11.
(Continued)

*Primary Examiner* — Nicholas A Jensen
*Assistant Examiner* — Oladiran Gideon Olaleye
(74) *Attorney, Agent, or Firm* — Kunzler Needham Hilton

(57) ABSTRACT

Apparatuses, methods, and systems are disclosed for radio-based sensing and joint communication. One apparatus includes a transceiver and a processor that receives a first configuration from a Radio Access Network ("RAN") node, where the first configuration includes a time-division duplex pattern with a set of symbols for radio-based sensing and a set of symbols for data/control channels. The processor receives a second configuration from the RAN node that includes one or more of: a waveform type indication, a sub
(Continued)

carrier spacing ("SCS") value, a carrier bandwidth for transmission and/or reception of radio-based sensing signals, and combinations thereof. Via the transceiver the processor transmits a radio-based sensing signal and a data/control channel according to the received configurations.

20 Claims, 10 Drawing Sheets

(51) Int. Cl.
*G01S 13/00* (2006.01)
*H04L 5/14* (2006.01)

(58) Field of Classification Search
USPC .......... 370/280
See application file for complete search history.

(56) References Cited

U.S. PATENT DOCUMENTS

| | | | | |
|---|---|---|---|---|
| 2019/0349898 | A1* | 11/2019 | Fu | H04L 27/0006 |
| 2020/0044796 | A1* | 2/2020 | Yang | H04W 56/00 |
| 2020/0120458 | A1* | 4/2020 | Aldana | H04W 28/22 |
| 2022/0287088 | A1* | 9/2022 | Tiirola | H04B 17/382 |
| 2022/0345188 | A1* | 10/2022 | Liu | H04B 7/0626 |
| 2023/0141170 | A1* | 5/2023 | Dai | H04L 5/0007<br>370/329 |

OTHER PUBLICATIONS

IEEE, "5G Radar: Scenarios, Numerology and Simulations", IEEE Xplore, Sep. 19, 2019, pp. 1-4.
IEEE, "802.11ad-Based Radar: An Approach to Joint Vehicular Communication-Radar System", IEEE Journals & Magazine, Nov. 17, 2017, pp. 1-4.
Rezaie et al., "Location- and Orientation-Aided Millimeter Wave Beam Selection Using Deep Learning", ICC 2020—2020 IEEE International Conference on Communications (ICC), 2020, pp. 1-7.
Zte et al., "Applications of Artificial Intelligence in MIMO Networks", 3GPP TSG RAN Meeting #89e RP-201771, Sep. 14-18, 2020, pp. 1-12.
3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.5.0, Sep. 2020, pp. 1-434.
3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.5.0, Sep. 2020, pp. 1-181.
3GPP, "3rd Generation Partnership Project; Technical Specification Group Radio Access Network; NR; Requirements for support of radio resource management (Release 16)", 3GPP TS 38.133 V16.5.0, Sep. 2020, pp. 1-1608.
3GPP, "3rd Generation Partnership Project; Technical Specification Group Radio Access Network; NR; Physical channels and modulation (Release 16)", 3GPP TS 38.211 V16.3.0, Sep. 2020, pp. 1-133.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; User Equipment (UE) radio access capabilities (Release 16)", 3GPP TS 38.306 V16.2.0, Sep. 2020, pp. 1-126.
3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

* cited by examiner

RADIO-BASED SENSING IN A RADIO ACCESS NETWORK

CROSS-REFERENCE TO RELATED APPLICATIONS

This application claims priority to U.S. Provisional Patent Application No. 63/122,922 entitled "RADAR SENSING AND JOINT COMMUNICATION" and filed on Dec. 8, 2020 for Ankit Bhamri, Ali Ramadan Ali, Sher Ali Cheema, Karthikeyan Ganesan, and Robin Thomas, which application is incorporated herein by reference.

FIELD

The subject matter disclosed herein relates generally to wireless communications and more particularly relates to facilitate radio-based sensing. The radio-based sensing can be applied to enhance communication procedures, for example enhancing beam management by identifying and localizing radio blockages via sensing.

BACKGROUND

In certain wireless networks, beam-based communication may be supported. Beam management procedures—including initial beam acquisition, beam training, beam refinement and beam failure recovery—rely heavily on constant/periodic exchange of reference signals and corresponding measurement reporting between the network and User Equipment ("UE") for both Uplink ("UL") and Downlink ("DL") control/data channel transmissions. Further, beam-management issues are escalated due to blockages (static and/or mobile) in the higher frequency range.

BRIEF SUMMARY

Disclosed are procedures for facilitating radio-based sensing to enhance communication procedure, for example, by identifying and localizing radio blockages via sensing. Said procedures may be implemented by apparatus, systems, methods, or computer program products.

One method of a User Equipment ("UE") for radio-based sensing and joint communication includes receiving a first configuration from a Radio Access Network ("RAN") node, where the first configuration includes a time-division duplex ("TDD") pattern with a set of symbols for radio-based sensing and a set of symbols for data and/or control ("data/control") channels. The method includes receiving a second configuration from the RAN node that includes one of more of: a waveform type indication, a subcarrier spacing ("SCS") value, a carrier bandwidth for transmission and/or reception of radio-based sensing signals, and combinations thereof. The method includes transmitting a radio-based sensing signal and a data/control channel according to the received configurations.

One method of a RAN node for radio-based sensing and joint communication includes transmitting a first configuration to a UE, where the first configuration includes a TDD pattern with a set of symbols for radio-based sensing and a set of symbols for data/control channels. The method includes transmitting a second configuration to the UE that comprises one or more of: a waveform type indication, a SCS value, a carrier bandwidth for transmission and/or reception of radio-based sensing signals, and combinations thereof. The method includes receiving a radio-based sensing signal and a data/control channel according to the first and second configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
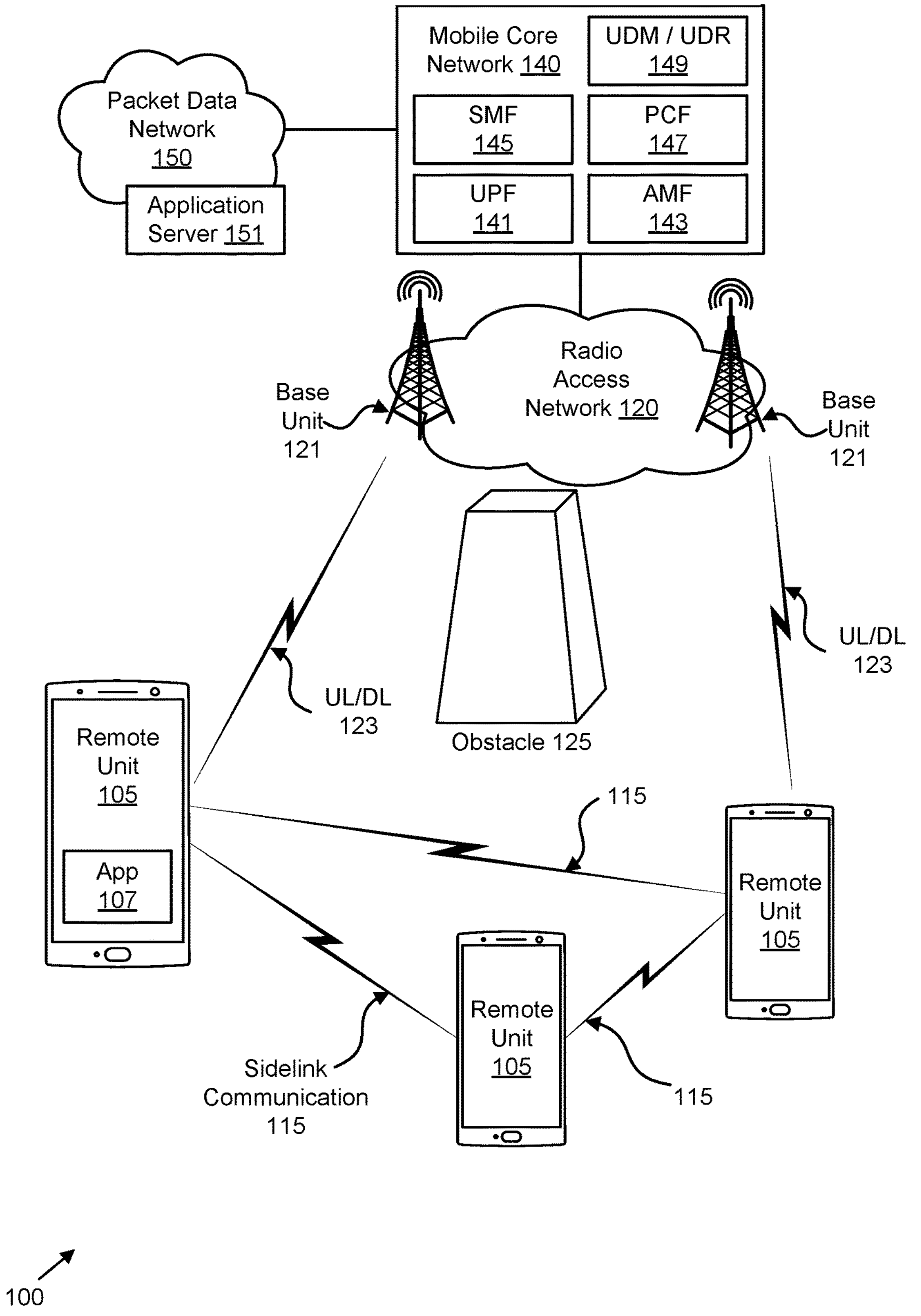
FIG. 1 is a block diagram illustrating one embodiment of a wireless communication system for radio-based sensing and joint communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for combined radio-based sensing and communication. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For higher frequency ranges, e.g., beyond 52.6 GHz, the problem of blockages is expected to be further escalated since obstacles with different types of material can severely attenuate or block the transmitted signal. Furthermore, the very narrow beams used at high frequencies can be blocked even by small sized obstacles and hence frequent beam failure may occur due to the mobility of the UE or the obstacle.

In Third Generation Partnership Project ("3GPP") New Radio ("NR") Releases 15 and 16 ("Rel-15/16"), beam-management procedures rely heavily on constant/periodic exchange of reference signals and corresponding measurement reporting between the network and UE for both UL and DL control/data channel transmissions. Consequently, the latency and overhead involved for such beam-management procedures is quite high.

As noted above, beam-management issues are escalated due to blockages (static and/or mobile) in the higher frequency range. Moreover, the issues are expected to be further escalated for higher frequency ranges where the beams would be required to be very narrow in order to serve different use cases. Depending up on the distance from the Transit/Receive Points ("TRPs") and beam width, the beam dwelling time could be as low as under 5 ms.

Disclosed herein are solutions that address these issues and ways for identifying and localizing the blockages via radio-based sensing that gives a new degree of freedom for the network to perform better beam selection, beam tracking and beam refinement. In various embodiments, a network utilizes radio-based sensing for beam blockage avoidance, e.g., to proactively avoid beam failure. As used herein, "radio-based sensing" refers to the transmission of a radio signal and using the echo, reflection and/or backscatter of the transmitted signal to locate objects in the environment, such as a building, a vehicle, or other obstacle or blockage. One example of radio-based sensing is radar where a radar signal (i.e., pulse) is transmitted and its reflection (i.e., echo) is used to calculate a distance between the transmitter and the reflector (i.e., obstacle or blockage). While radar sensing is used to describe several of the below examples and solutions, in other embodiment other types of radio signals (e.g., reference signals and/or data signals) may be used for radio-based sensing.

For full-duplex systems, radio-based sensing assisted beam management may be performed using New Radio ("NR") downlink, uplink, and/or sidelink ("DL/UL/SL") signals, for which gNB and/or UEs use their own backscattered transmitted signals for identifying blockages in a specific area of the cell. In some embodiments, radio-based sensing can be performed on the DL/UL/SL reference signal ("RS") resources such as Demodulation RS, Channel State Information RS, and/or Sounding RS ("DMRS/CSI-RS/SRS") that are used for data transmission, or on dedicated radio-based sensing RS. In some embodiments, dedicated DL/UL/SL radio-based sensing RS are configured in a periodic transmission where the periodicity of the RS depends on the frequency band/range, beamwidth, mobility of UEs, long term blockage statistics, and/or long-term beam failure statistics.

For half-duplex operation, the network configures plurality of transmit/receive points ("TRPs") to perform cooperative radio-based sensing signal transmission and reception using DL signals in configured slots for each transmit/receive point ("TRP"). The network configures plurality of UEs to perform cooperative radio-based sensing signal transmission and reception using their UL or SL signals. Here, UEs configured to perform radio-based sensing by a gNB are also configured with resources to share the sensing information with the gNB. Techniques, architectures, configurations, and procedures for radio-based sensing assisted beam management are described in greater detail in International Patent Application PCT/IB2021/060725, titled "RADIO-BASED SENSING IN A RADIO ACCESS NETWORK" and filed on 18 Nov. 2021 for Ali Ramadan Ali, Ankit Bhamri, Sher Ali Cheema, Karthikeyan Ganesan, and Robin Thomas, which application is incorporated herein by reference.

Moreover, the below solutions describe a configuration to facilitate time-division duplexing between radio-based sensing signals and UL and/or DL channels (i.e., data/control channels) within same or different slots in NR. In some embodiments, this configuration may use different types of new radio-based sensing symbols in a radio frame, including transmission only radio-based sensing symbol (half-duplex), reception only radio-based sensing symbol (half-duplex) and radio-based sensing symbol for simultaneous transmission/reception (full-duplex). In some embodiments, the radio frame may include a configurable guard band gap depending up on SCS values to allow switching between radio-based sensing signal and UL/DL data/control.

To support radio-based sensing and joint communication, an indication and association of Bandwidth Parts ("BWPs"), including SCS values for radio-based sensing signals is disclosed. Also disclosed is an indication and association of waveform type and/or SCS value and/or frequency range and/or carrier bandwidth size for radio-based sensing signals.

Additionally, while the solutions discussed in this disclosure facilitate radio-based sensing, these solution are also applicable to improve/enhance other communication procedures as well.

FIG. 1 depicts a wireless communication system 100 for radio-based sensing and joint communication, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

In various embodiments, the remote units 105 may communicate directly with each other (e.g., device-to-device communication) using sidelink ("SL") communication signals 115. Here, SL transmissions may occur on SL resources, for example on the Physical Sidelink Control Channel ("PSCCH"), Physical Sidelink Feedback Channel ("PSFCH"), and/or Physical Sidelink Shared Channel ("PSSCH"). As discussed above, a remote unit 105 may be provided with different SL communication resources for different SL modes. Mode-1 corresponds to a NR network-scheduled SL communication mode. Mode-2 corresponds to an NR UE-scheduled SL communication mode. Examples of SL communication include Vehicle-to-Everything ("V2X") communications and PC5 communications.

In various embodiments, sidelink transmissions from a "transmitting" remote unit 105 (i.e., Tx UE) may be groupcast or unicast. Groupcast refers to group communications where the transmitting remote unit 105 in the group transits a multicast packet to its group members, where the members of the group belong to the same destination group identifier ("ID"). Each UE (i.e., remote unit 105) in the group will have a member ID. A "receiving" remote unit 105 may provide Hybrid Automatic Repeat Request ("HARQ") feedback to the transmitting remote unit 105.

In various embodiments, SL communication signals 115 may be sent on frequencies in the Frequency Range #2 ("FR2") band, e.g., 24.25 GHz to 52.6 GHz. In some embodiments, SL communication signals 115 may be sent on frequencies beyond the FR2 band, e.g., using the ITS band at 60 GHz to 70 GHz. The SL communication signals 115 may include data signals, control information, and/or reference signals.

In certain embodiments, the transmitting remote unit 105 groupcasts using an omnidirectional antenna. In other embodiments, the transmitting remote unit 105 groupcasts data using beam sweeping. As used herein, beam sweeping refers to the transmitting remote unit 105 transmitting the groupcast in predefined directions/beams in sequence, wherein the sequence is indexed and the sequence/index is transmitted as part of the sidelink control channel (e.g., in sidelink control information ("SCI")). The transmitting remote unit 105 may dynamically signal (in SCI) information about transmission patterns and periodicity. For example, the transmitting remote unit 105 may transmit a signal (e.g., groupcast message) on a first beam during a first set of transmission symbol duration (e.g., first slot), transmit the signal on a second beam during a second set of transmission symbol duration (e.g., second slot), etc.

As mentioned previously, it may happen that a remote unit 105 (i.e., a UE) may experience radio blockages when operating at higher frequency ranges, e.g., beyond 52.6 GHz. Moreover, it is expected that the issue of radio blockages will be escalated at these higher frequencies as compared to lower frequencies because obstacles 125 with different types of material can severely attenuate or block the transmitted signal. Furthermore, the very narrow beams used at high frequencies may be blocked even by small sized obstacles 125 and hence frequent beam failure can occur due to the mobility of the remote unit 105 or the obstacle 125.

In some embodiments, the base units 121 may configure a plurality of remote units 105 to perform radio-based sensing signal transmission and reception of the reflected signals to identify and localize permanent or temporary obstacles 125 such as a moving object or human or periodically occurring obstacles 125 in a certain area of the cell.

In certain embodiments, the remote units 105 configured to perform radio-based sensing by a base unit 121 are also configured with resources to share the sensing information with the base unit 121 and can also be configured with duration (such as symbols, slots, frames) for which the remote unit 105 is required to perform sensing.

In various embodiments, radio-based sensing can be performed on the DL/UL/SL RS resources such as DMRS/CSI-RS/SRS that are used for data transmission, or on dedicated radio-based sensing RS, or Positioning Reference Signal ("PRS") and/or adapted radio-based sensing PRS.

The knowledge of the nature and the location of the blockages can be utilized as extra information for the base unit 121 and/or remote unit(s) 105 entering a specific area to perform better and fast DL/UL/SL beam management that avoids the identified blockages for future transmissions and hence reduces the overhead and latency of performing continuous Channel State Information ("CSI") measurements and reporting. The information of obstacle(s) 125 can also be used for building/updating a heat map for channel finger printing. The solution is more suitable for NR working at high frequencies (e.g., in the mmWave band) that enable the configuration signaling and reporting of temporal and spatial information of the blockages with high resolution thanks to the large available bandwidth ("BW") and the use of narrow beams.

In various embodiments, a remote units 105 may receive a first configuration from the network (i.e., the base unit 121) that consists of at least one TDD pattern with symbol(s) for radio-based sensing signal/channel and symbol(s) for data/control channels for downlink and/or uplink. The remote unit 105 may also receive a second configuration from the network that consists of at least one waveform type indication, one subcarrier spacing value (numerology) and one carrier bandwidth for transmission and/or reception of radio-based sensing signals.

In some embodiments, the first configuration consists of separate indication of a radio-based sensing symbol for reception at the remote unit 105 and a radio-based sensing symbol for transmission from the remote unit 105. In some embodiments, the first configuration consists of indication of single type of radio-based sensing symbol that can be used for transmission and reception of radio-based sensing signal at the same time, i.e., a full-duplex remote unit 105.

In some embodiments, the first configuration consists of an indication of flexible type of radio-based sensing symbol and that can be separately indicated to only be used for radio-based sensing signal transmission. In some embodiments, the first configuration consists of indication of flexible type of radio-based sensing symbol and that can be separately indicated to only be used for radio-based sensing signal reception. In some embodiments, the configuration for TDD pattern consists of indication of flexible type of radio-based sensing symbol and that can be separately indicated to be used for either downlink, uplink, radio-based sensing signal transmission or radio-based sensing signal reception.

In some embodiments, the TDD configuration is dedicated configuration for a remote unit 105. In other embodiments, the TDD configuration is common configuration for all the remote units 105 in a serving cell. In some embodiments, a separate configuration/indication for indicating a radio-based sensing symbol is received by the remote unit 105 that overrides the symbol type indicated by TDD configuration for a UL/DL symbol or as flexible symbol.

In some embodiments, at least one separate BWP is indicated to the remote unit 105 for transmission and/or reception of radio-based sensing signals and a separate subcarrier spacing value (numerology). In some embodiments, the carrier bandwidth is a BWP, where no separate BWP is explicitly indicated for transmission and/or reception of radio-based sensing signal and the BWP activated for uplink and/or downlink is used for radio-based sensing. In certain embodiments, among the activated BWP for UL and DL, one BWP that is associated with the highest SCS is used for radio-based sensing. In certain embodiments, the UL BWP is used for radio-based sensing transmission from the UE and DL BWP is used for radio-based sensing reception at the UE.

In some embodiments, the remote unit 105 is configured/indicated with a waveform type for transmission/reception of radio-based sensing signal. In some embodiments, the remote unit 105 is configured with mapping table between the SCS value and waveform type for transmission/reception of radio-based sensing signal.

In some embodiments, the remote unit 105 is configured with mapping table between the frequency range value and waveform type for transmission/reception of radio-based sensing signal. In some embodiments, the remote unit 105 is configured with mapping table between the carrier bandwidth size and waveform type for transmission/reception of radio-based sensing signal.

In some embodiments, the remote unit 105 is configured with guard band gap to apply switching between radio-based sensing signal and DL/UL control/data channel. In some embodiments, the remote unit 105 is configured with a mapping between multiple values of guard band gaps and multiple values of SCS (numerology) difference between the SCS of radio-based sensing signal and SCS of DL/UL data/control channel. In certain embodiments, the guard band gap is applied between DL symbol and sensing signal for transmission from the UE; between UL symbol and sensing symbol for reception at the UE; and between sensing symbol for transmission from the UE and sensing symbol for reception at the UE.

While FIG. 1 depicts components of a 5G RAN and a 5G core network, the described embodiments for radio-based sensing and joint communication apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for radio-based sensing and joint communication.

Figure 2:
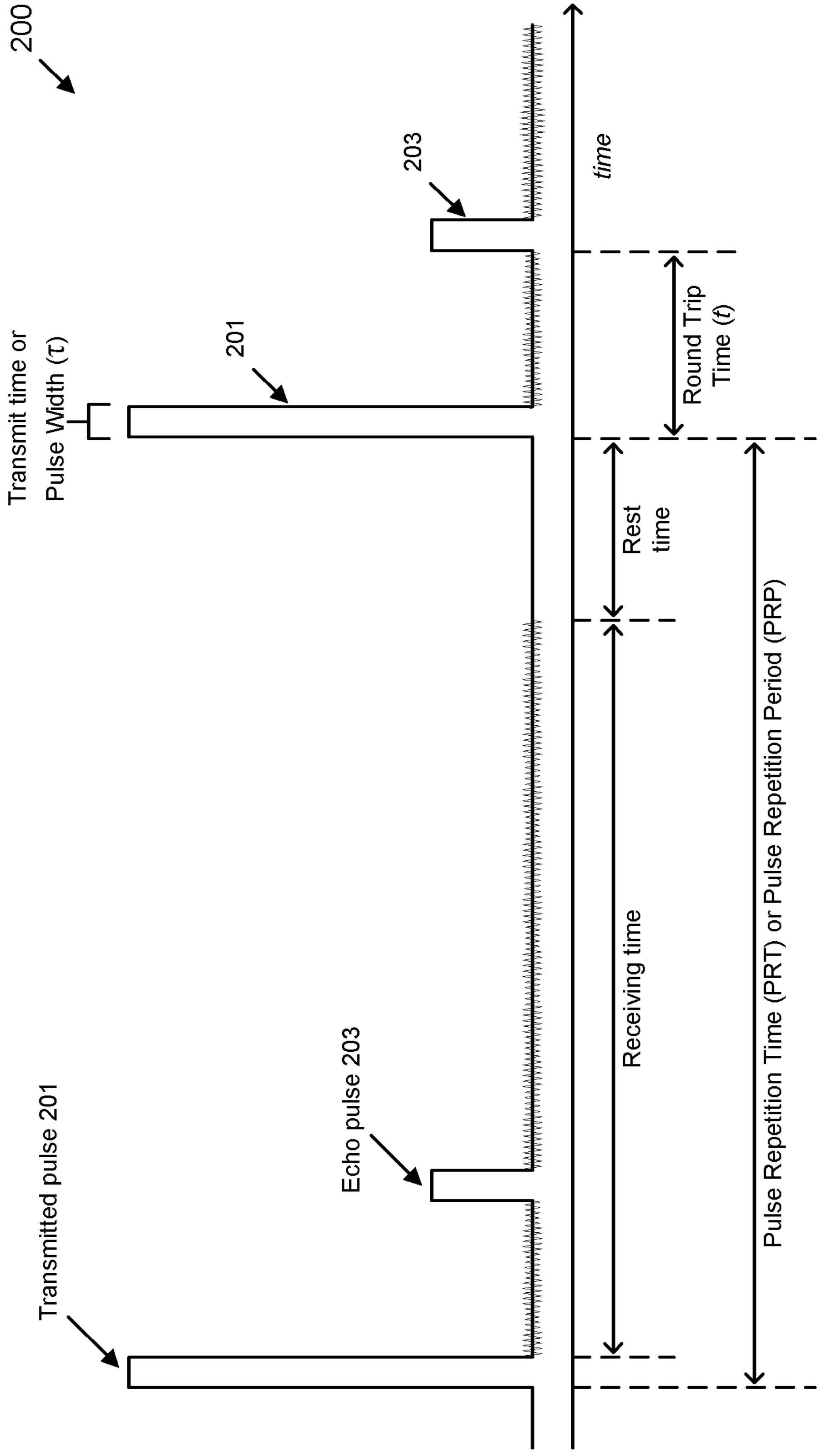
FIG. 2 is a diagram illustrating one embodiment of Time-Domain representation of a radio-based sensing pulse and return echo signal.

FIG. 2 is a diagram illustrating one embodiment of Time Domain Representation 200 of a Radar Pulse and Return Echo signal, according to embodiments of the disclosure. Communication and Radar technologies have been traditionally deployed as separate/independent systems, each with a separate waveform. There are, however, use cases such as the automotive, smart factory, medical monitoring, etc., where joint radio communications and radar sensing using the same waveform are considered beneficial for efficient usage of the Radio Frequency ("RF") spectrum as well usage of the same hardware to perform high data rate communications and precise ranging.

Radar systems can be classified into the following categories:

- Monostatic radars: A radar system in which the transmitter and receiver are collocated.
- Bistatic radar: A radar system that comprises of a transmitter and receiver that are separated by a distance comparable to the expected target distance.
- Multistatic radar: A radar system which includes multiple spatially diverse monostatic radar or bistatic radar components within an overlapping coverage area.

Radar signals are characterized by pulses that are modulated onto an RF carrier and are used to detect single/multiple objects that can be resolved in the time domain. FIG. 2 depicts a transmitted pulse 201 having a transmit time, τ (also referred to as "Pulse Width"). The reflected signal, referred to as echo pulse 203, is received some time later. In a basic scenario, for a single reflector, a pulse with measured round-trip time t allows the range (R) with respect to the object to be calculated as:

$$R = \frac{ct}{2}$$

while the range resolution (ΔR) is calculated as:

$$\Delta R = \frac{c\tau}{2}$$

where τ is the pulse width and c is the speed of light. The radar pulses 201 are usually transmitted periodically so that range information can be provided in real time and wait for the returning echo signal during the so-called rest time (or listening time) as shown in FIG. 2. The time between successive radar pulse transmissions is referred to as the Pulse Repetition Time ("PRT") or Pulse Repetition Period ("PRP"). The PRT may be divided into a receiving time, during which monitoring for the echo pulse 203 occurs, and a rest time.

Figure 3:
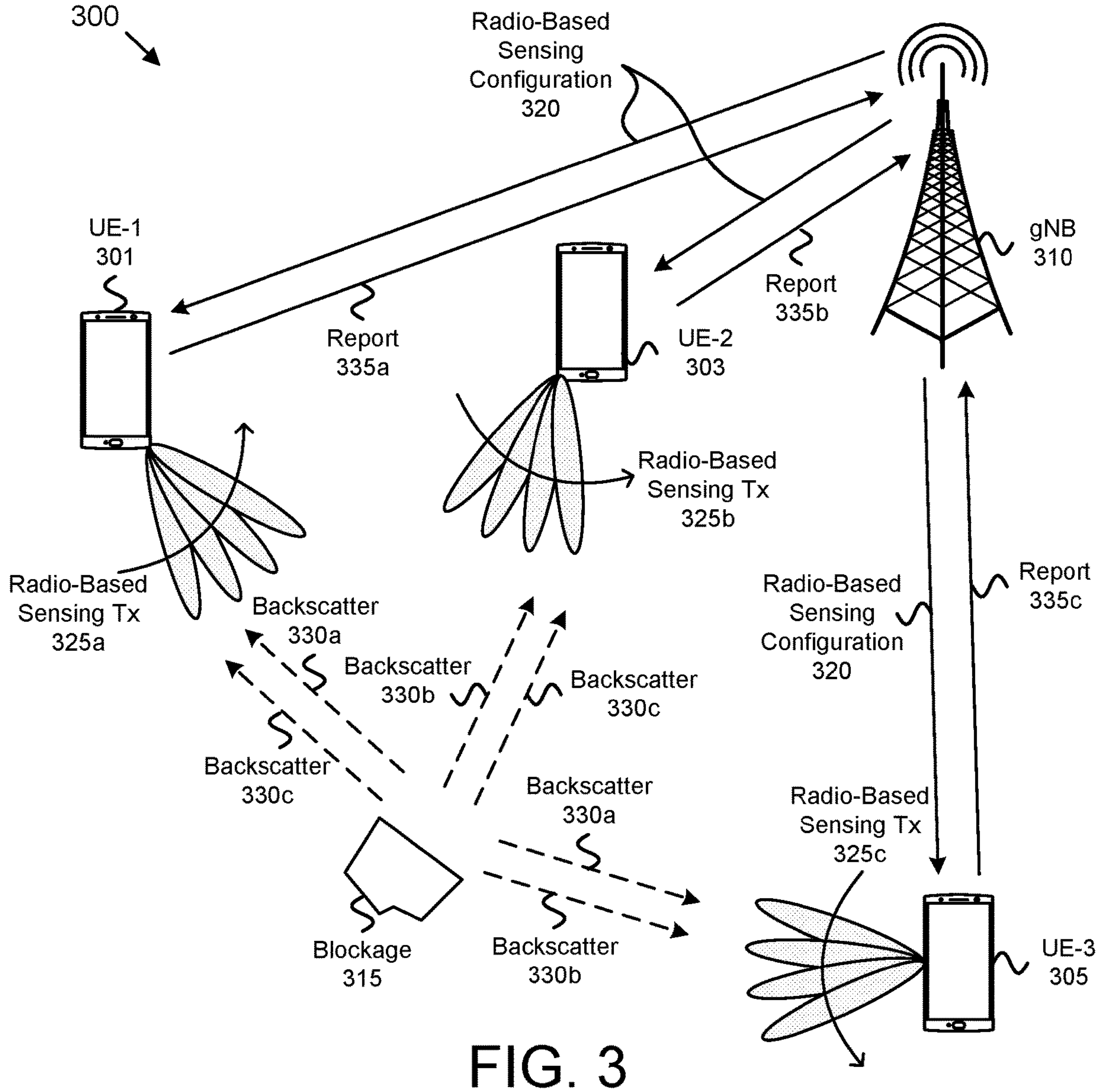
FIG. 3 is a diagram illustrating one embodiment of radio-based sensing in a RAN.

FIG. 3 depicts one example of radio-based sensing in a RAN 300, according to embodiments of the disclosure. The RAN 300 involves a gNB 310 and a plurality of UEs, depicted here as a first UE 301 (denoted "UE-1"), a second UE 303 (denoted "UE-2"), and a third UE 305 (denoted "UE-3"). Note that a blockage 315 exists within a coverage area of the RAN.

In the depicted embodiment, the gNB 310 configures the first UE 301, the second UE 303 and the third UE 305 to perform cooperative radio-based sensing (see radio-based sensing configurations 320). If the UEs 301-305 are localized, the gNB 310 may groupcast the location information of the intended UEs. The gNB 310 may indicate a slot format (i.e., a-domain configuration) to the UEs 301-305 to use for radio-based sensing. As described in greater detail below, the slot format may indicate one or more symbols within a NR slot to perform radio-based sensing, either by transmitting a radio-based sensing-sensing signal or receiving a radio-based sensing-sensing signal. In certain embodiments, the gNB 310 configures the UEs 301-305 with an area of interest towards which beamforming radio-based sensing-sensing transmission and/or reception is aimed (e.g., by selecting one or more transmit beams and/or one or more receive beams in the direction of the area of interest). The gNB 310 may also configure the UEs 301-305 with UL slot(s) to report measurements taken during a radio-based sensing reception symbol.

In one embodiment, the first UE 301, the second UE 303 and/or the third UE 305 perform radio-based sensing signal transmissions towards a certain area of interest (e.g., a suspected location of blockage 315) according to the received configuration. Where a UE is full-duplex capable, the same radio-based sensing symbol may be used for both transmission and reception of radio-based sensing-sensing signals simultaneously. Where a UE is not full-duplex capable (i.e., the UE is half-duplex capable), then a radio-based sensing symbol may be used to transmit a radio-based sensing-sensing signal or to receive a radio-based sensing-sensing signal transmitted by another entity in the RAN 300. In one embodiment, the radio-based sensing signal transmissions are performed using multiple narrow beams in beam-sweeping manner. In another embodiment, the radio-based sensing signal transmissions are performed by transmitting multiple narrow beams simultaneously. In other embodiments, the radio-based sensing signal transmissions may be performed using one or more wide beams.

In the depiction of FIG. 3, the first UE 301 transmits a radio-based sensing signal 325*a*, the second UE 303 transmits a radio-based sensing signal 325*b*, and the third UE 305 transmits a radio-based sensing signal 325*c*. Reflected signals corresponding to the radio-based sensing signal transmission 325*a* are referred to as backscatter signals 330*a*. Reflected signals corresponding to the radio-based sensing signal transmission 325*b* are referred to as backscatter signals 330*b*. Reflected signals corresponding to the radio-based sensing signal transmission 325*c* are referred to as backscatter signals 330*c*.

After performing channel measurements and subtracting the direct paths and the time/direction information related to out-of-area, the UEs 301-305 report their radio-based to sensing-sensing measurements to the gNB 310, such as the time/direction information of signal reflections. In the depicted embodiment, the first UE 301 sends the report 335*a* containing radio-based sensing-sensing measurements (i.e., time/direction information), the second UE 303 sends the report 335*b* containing radio-based sensing-sensing measurements, and the third UE 305 sends the report 335*c*, also containing radio-based sensing-sensing measurements.

Using the radio-based sensing-sensing measurements, the gNB 310 can detect and locate the blockage 315 and configure (or reconfigure) beams used in the RAN 300 to avoid or mitigate beam failure. In some embodiments, the gNB 310 may configure the UEs 301-305 to perform repetition of radio-based sensing signal transmission/reception and report the time information after each period (i.e., after each repetition). Alternatively, the UEs 301-305 may be configured to report a combined/averaged measurement information after multiple of repetitions.

According to the solutions disclosed herein, radio-based sensing channels may be integrated with uplink/downlink/sidelink channels in NR slot/subframe/frame structure by following enhancements. In some embodiments, the RAN may provide separate channel for radio-based sensing (different from downlink/uplink/sidelink communication channels). In one embodiment, the slot format indicator may be enhanced to indicate dedicated radio-based sensing time-domain symbols. In another embodiment, the RAN may indicate a radio-based sensing mode, i.e., full-duplex or half-duplex, to be used by the UEs. In some embodiments, the RAN may provide separate indication and/or association and/or configuration of numerology for radio-based sensing. In some embodiments, the RAN may provide separate indication and/or association and/or configuration of waveform, subcarrier spacing, bandwidth part for radio-based sensing.

One of the key benefits of TDD between radio-based sensing and communication channel with the proposed enhancements is that the waveform for radio-based sensing can either be same as for communication, i.e., Cyclic Prefix Orthogonal Frequency Division Multiplexing ("CP-OFDM") or Discrete Fourier Transform Spread OFDM ("DFT-s-OFDM") currently supported in NR or a new waveform more suitable for radio-based sensing signals. Nevertheless, with TDD, it is not required to modify the data/control communication waveforms.

Disclosed herein is a first solution for slot format indicator enhancements for radio-based sensing. According to embodiments of the first solution, the slot format for NR is enhanced to include radio-based sensing symbols in addition to downlink, uplink and flexible symbols such that the UE is expected to transmit or receive only radio-based sensing signals/channels in the symbols configured/indicated as radio-based sensing symbols. As used herein, the term "radio-based sensing symbol" refers to a time-domain unit, e.g., an OFDM symbol, dedicated for radio-based sensing-sensing use. An example of an enhanced table for slot format indicator is shown in Table 1. In Table 1, the symbol "D" denotes a downlink symbol, "U" denotes an uplink symbol, "R" denotes a radio-based sensing symbol, and "F" denotes a flexible symbol.

TABLE 1

Illustration of slot format indicator with radio-based sensing symbols (R)

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | R | R | R | R | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | R | R | R | R | D | D | D | F | F |
| 5 | D | D | D | D | D | D | D | D | D | D | D | F | F | F |
| 6 | D | D | D | D | D | D | D | D | D | D | F | F | F | F |
| 7 | R | R | R | R | D | D | D | U | U | F | F | F | F | F |
| . . . | | | | | | | | | | | | | | |

In one implementation of the first solution, further classification of radio-based sensing symbols can be separately configured and/or indicated to the UE for determining whether the radio-based sensing symbol is used for transmission of radio-based sensing signals/channels, reception of radio-based sensing signals/channels, or for both transmission and reception in case of full-duplex.

In one implementation, full-duplex radio-based sensing mode is indicated for the respective slots through MAC Control Element ("CE") or in advance through the Downlink Control Information ("DCI") of previous slots. In some embodiments, radio-based sensing may employ a compact DCI to indicate reduce radio-based sensing signaling data.

Figure 4:
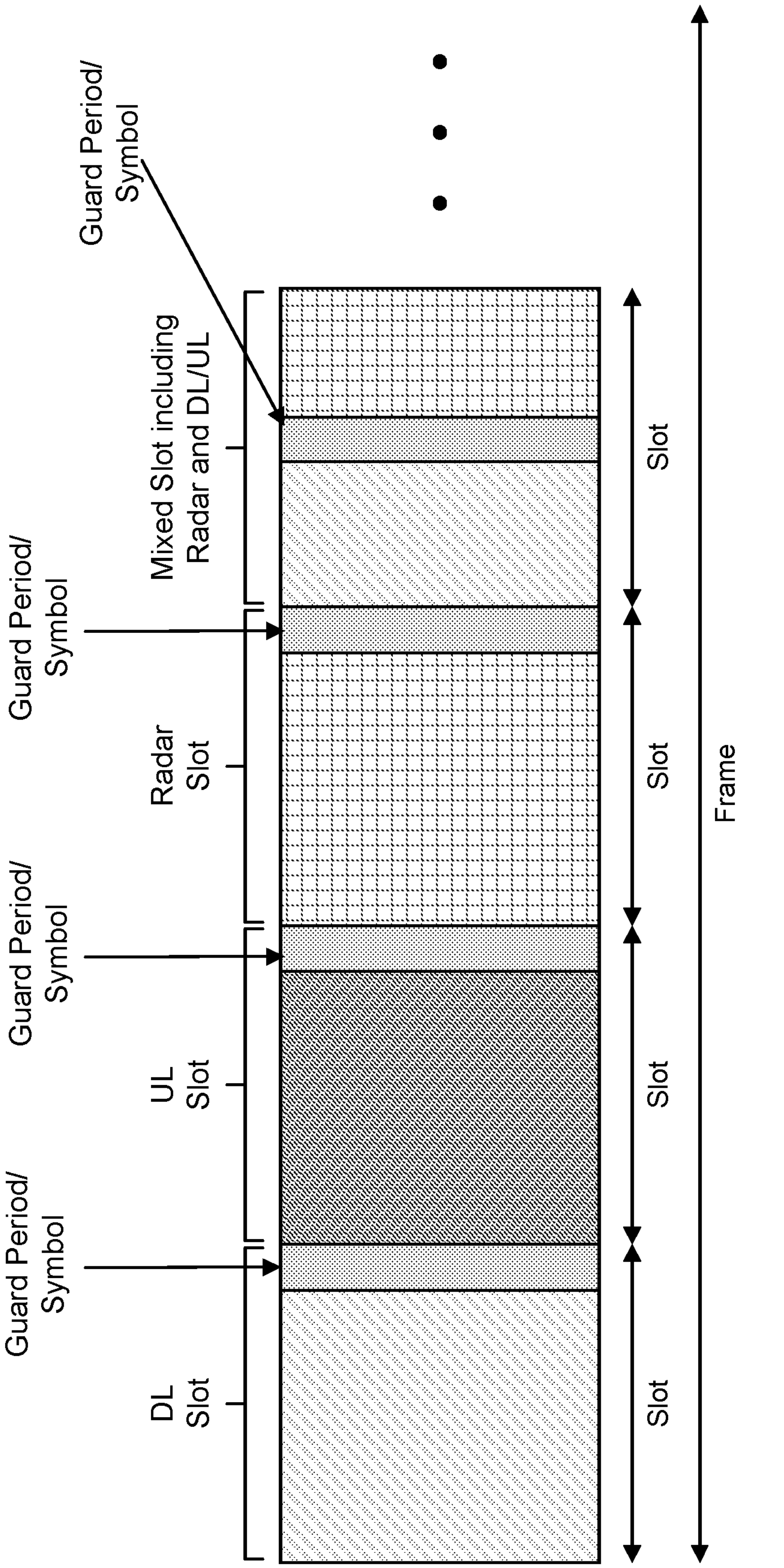
FIG. 4 is a diagram illustrating one embodiment of a radio frame with a radio-based sensing-sensing slot.

FIG. 4 depicts a NR slot 400 with TDD between DL, UL and radar sensing channel with dedicated symbols and/or slots, according to embodiments of the disclosure. In the depicted embodiment, the first slot is a DL slot, and the second slot is a UL slot. The third slot is a radar sensing slot (denoted "radar slot") and the fourth slot is a mixed slot with at least one radar symbol and at least one downlink symbol. Note that in other embodiments the mixed slot may include a different combination of radar symbol, uplink symbol, downlink symbol, and flexible symbol. A guard period (i.e., a guard symbol) is located between the DL slot and the UL slot. In certain embodiments, there may also be a guard period between a DL slot and a Radar slot, or between an UL slot and a Radar slot. While FIG. 4 is described in the context of radar sensing, in other embodiments different radio signals (e.g., reference signals and/or data signals) may be used for radio-based sensing. In such embodiments, the depicted "Radar slot" would be replaced with a radio-based sensing slot.

In an alternate embodiment of the first solution, a radio-based sensing symbol may be further categorized according by transmission, reception, or both. Accordingly, three categories of radio-based sensing symbols may be defined and indicated via slot format indicator. In such embodiments, a first indicator designates a radio-based sensing symbol for reception (as an example, this may be denoted by "RR"), a second indicator designates a radio-based sensing symbol for transmission (as an example, this may be denoted by "RT"), and a third indicator designates a radio-based sensing symbol for both transmission and reception (as an example, this may be donated as "RTR"). The radio-based sensing symbols are positioned contiguously in a particular slot format such that the same echo/backscattered signal is received/listened to within the appropriated time interval and therefore the radio-based sensing symbols for transmission and reception would have to be indicated accordingly.

In some embodiments, the transmission of radio-based sensing channels/signals on the indicated radio-based sensing symbols can be to either a network node and/or another UE node and similarly the reception of radio-based sensing channels/signals on the indicated radio-based sensing symbols can be from either network node and/or another UE node. In this case, no distinction is needed for sidelink ("SL") based radio-based sensing signals/channels.

In some embodiments of the first solution, a guard period is expected while switching in following cases:

- DL to R (either of radio-based sensing transmission, reception or both)
- R to DL
- UL to R
- R to UL In some embodiments, a guard period is not expected in the following cases:

- DL to RR (radio-based sensing reception)
- RR to DL
- UL to RT (radio-based sensing transmission)
- RT to UL In some embodiments, the guard band length can be configured or mapped according to the different between the numerology (e.g., SCS values) between the radio-based sensing signal and UL/DL symbols.

In some embodiments, the guard band length can be configured or mapped according to the difference between the cyclic prefix ("CP") lengths between the radio-based sensing signal and UL/DL, e.g., normal or extended CPs, if CP based waveforms are employed.

In certain embodiments, a UE is provided information element ("IE") tdd-UL-DL-R (or RR or RT or RTR)-ConfigurationCommon. In such embodiments, the UE sets the slot format per slot over a number of slots as indicated by tdd-UL-DL-R (or RR or RT or RTR)-ConfigurationCommon.

The IE tdd-UL-DL-R (or RR or RT or RTR)-ConfigurationCommon provides a reference SCS configuration $\mu_{ref}$ by parameter referenceSubcarrierSpacing (for UL and DL and radio-based sensing symbols) and a slot pattern by parameter pattern1.

Alternatively, the IE tdd-UL-DL-R (or RR or RT or RTR)-ConfigurationCommon provides a reference SCS configuration $\mu_{ref}$ by parameter referenceSubcarrierSpacing (for UL and DL), an additional reference SCS configuration $\mu_{ref}$ by parameter referenceSubcarrierSpacing (for radio-based sensing symbols), and a slot pattern by parameter pattern1.

The parameter pattern1 provides:

- a slot configuration period of P msec by dl-UL-R-TransmissionPeriodicity
- a number of slots $d_{slots}$ with only downlink symbols by nrofDownlinkSlots
- a number of downlink symbols $d_{sym}$ by nrofDownlinkSymbols
- a number of slots $u_{slots}$ with only uplink symbols by nrofUplinkSlots
- a number of uplink symbols $u_{sym}$ by nrofUplinkSymbols
- a number of slots with only radio-based sensing symbols by nrofRadarSlots
- a number of radio-based sensing symbols by nrofRadarSymbols In some embodiments more than one pattern can be included such that the slot configuration period is combination of all the patterns.

In some embodiments, the UE is additionally provided the IE tdd-UL-DL-R (or RR or RT or RTR)-ConfigurationDedicated, wherein the IE tdd-UL-DL-R (or RR or RT or RTR)-ConfigurationDedicated overrides only flexible symbols per slot over the number of slots as provided by tdd-UL-DL-R (or RR or RT or RTR)-ConfigurationCommon.

The IE tdd-UL-DL-R (or RR or RT or RTR)-ConfigurationDedicated provides: A) a set of slot configurations by IE slotSpecificConfigurationsToAddModList; B) for each slot configuration from the set of slot configurations; C) a slot index for a slot provided by slotIndex; and D) a set of symbols for a slot using the value 'symbols,' where:

- if 'symbols'=allDownlink, then all symbols in the slot are downlink
- if 'symbols'=allUplink, then all symbols in the slot are uplink if 'symbols'=allRadar, then all symbols in the slot are radio-based sensing (either for transmission, reception, or both)

if 'symbols'=explicit, then parameter nrofDownlinkSymbols provides a number of downlink first symbols in the slot, nrofUplinkSymbols provides a number of uplink last symbols in the slot and nrofRadarSymbols provides a number of uplink last symbols in the slot.

Note that for 'symbols'=explicit, if nrofDownlinkSymbols is not provided, then there are no downlink first symbols in the slot; if nrofUplinkSymbols is not provided, then there are no uplink last symbols in the slot; and if nrofRadarSymbols is not provided, then there are no radio-based sensing last symbols in the slot. The remaining symbols in the slot are flexible.

In some embodiments of the first solution, specific radio-based sensing symbols for transmission and reception are included in the configuration instead of just radio-based sensing symbols.

In some embodiments of the first solution, the UE may be dynamically indicated with the slot format indicator either with one of existing DCI format such as DCI format 2_0 or a new DCI format to indicate symbols or slots for radio-based sensing transmission/reception.

In alternate embodiments of the first solution, radio-based sensing symbols or slots are configured/indicated separately and not included as part of the slot format indicator. If such configuration is provided via semi-static signaling such as Radio Resource Control ("RRC") and indicates some symbols or slots for radio-based sensing transmission/reception, then it is expected to override any common RRC signaling indication DL/UL symbol or slots for TDD configuration.

In some embodiments of the first solution, radio-based sensing symbols or slots are indicated dynamically and separately from the TDD DL/UL slot format indicator, e.g., slots containing only dedicated radio-based sensing symbols via a separate field or any other DCI formats (not specifically tied to Slot Format Indicator ("SFI")). If such a dynamic indication is provided, then the UE is expected to override any other dynamic or semi-static configuration for TDD DL/UL configuration. For example, the symbol indicated as DL or UL of flexible by SFI and also it is indicated as radio-based sensing symbol by dynamic indication, then the radio-based sensing symbol is prioritized over DL or UL symbols.

In some embodiments, the flexible symbols in the slot can be indicated as radio-based sensing symbols via DCI or MAC CE and/or semi-static configuration via RRC.

In some embodiments, radio-based sensing signal is transmitted in the DL symbols/slots by the gNB, and such configuration is semi statically or dynamically provided to the UE so that the UE does not monitor PDCCH/PDSCH in such slots or symbols.

In some embodiments, radio-based sensing signal is transmitted in the UL and/or SL symbols/slots by the UE and such configuration is semi statically provided to the UE. Note that the UE does not transmit any other data or control signals during that period and the gNB does not expect PUCCH, PUSCH, or Sounding Reference Signal ("SRS") during that period. Disclosed herein is a second solution that support separate BWP/numerology configuration for radio-based sensing. According to embodiments of the second solution, separate dedicated BWPs can be configured for radio-based sensing (in addition to DL and UL BWPs) in a semi-static manner via RRC signaling and one or multiple BWPs from the configured BWPs can be activated by DCI. It can be explicitly activated via separate field in the DCI. Note that the BWP configuration may be separately received from the slot format configuration. In other embodiments, the BWP configuration may be received with the slot format configuration.

In some embodiments of the second solution, only one BWP for radio-based sensing is configured for a UE and it is implicitly activated only when a symbol or slot is configured/indicated for radio-based sensing transmission/reception. In some embodiments, separate BWP(s) are configured/activated for each of radio-based sensing signal/channel transmission and reception. In such embodiments, each BWP can be associated with specific value of subcarrier spacing (numerology) that can be different from DL and/or UL.

In alternate embodiments of the second solution, no separate/dedicate BWP is configured/indicated for radio-based sensing signals/channels and either or both of DL/UL BWPs can be used. In one example, for radio-based sensing signal reception at the UE, DL BWP can be used and for radio-based sensing signal transmission at the UE, UL BWP can be used. In such embodiments, the UE is expected to apply associated numerology. In some embodiment, radio-based sensing signal is transmitted and/or received by the gNB in one of the DL BWP and radio-based sensing signal is transmitted and/or received by the UE in one of the UL BWP and/or SL BWP.

In some embodiments of the second solution, regardless of how or which BWPs are applied for radio-based sensing channels/signals, a separate subcarrier spacing value (numerology) is configured/indicated for radio-based sensing. In some implementation, same numerology is applied for both radio-based sensing reception/transmission at the UE, while in some alternate implementation, separate numerologies can be applied for each of the radio-based sensing reception and transmission procedures.

In some embodiments of the second solution, no explicit numerology and/or BWP is configured/indicated for radio-based sensing, then one of the configured/indicated numerology from DL/UL is selected for radio-based sensing. The selection is based on the value of subcarrier spacing to satisfy the requirements for the pulse duration needed for a radio-based sensing signal. In some implementations, the highest value from among the configured/indicated numerologies (for either of DL/UL) is selected for radio-based sensing.

In some embodiments of the second solution, a common BWP is configured in a cell for the transmission/reception of radio-based sensing signals by network. In other embodiments of the second solution, no BWP is defined for radio-based sensing and, hence, a radio-based sensing RRC configuration can provide bandwidth, SCS, CP duration, time/frequency resource and a set of carriers for transmitting and/or receiving the radio-based sensing signal.

Disclosed herein is a third solution that supports separate waveform configuration for radio-based sensing. According to embodiments of the third solution, a separate/dedicated waveform is either semi-statically configured or dynamically indicated to the UE for radio-based sensing that may be different from the waveform for either of DL or UL. Note that the waveform configuration may be separately received from the slot format configuration and/or the BWP configuration. In other embodiments, the waveform configuration may be received with the slot format configuration and/or the BWP configuration.

In some embodiments of the third solution, multiple waveforms can be configured, but only one specific waveform is applied depending upon the subcarrier spacing and/or frequency range applied for radio-based sensing transmission/reception. In one implementation, the UE is configured with a mapping table between subcarrier spacing and waveform type for radio-based sensing transmission/reception/as illustrated in Table 2.

TABLE 2

Mapping between SCS and radio-based sensing waveform type

| Index | SCS (numerology) | Radio-based sensing Waveform |
|---|---|---|
| 0 | 15 kHz to 120 kHz | Frequency modulated continuous wave (FMCW) |
| 1 | 240 kHz to 480 kHz | CP-OFDM |
| 2 | 960 kHz to 1920 kHz | DFT-s-OFDM |
| 3 | >15360 kHz | CP-OFDM/DFT-s-OFDM (pulse) |

Figure 5:
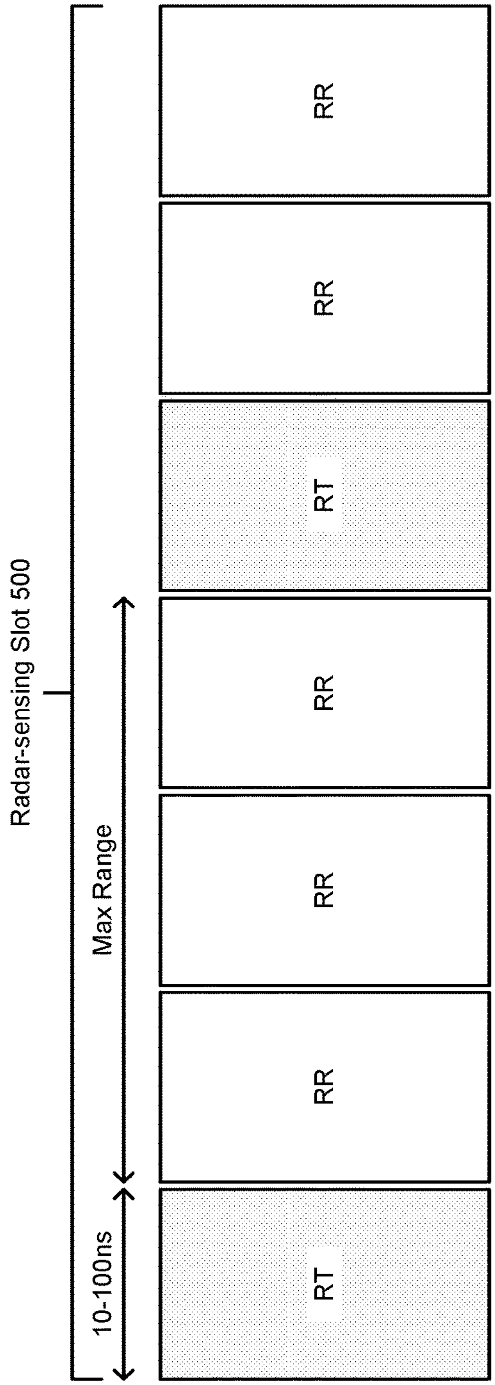
FIG. 5 is a diagram illustrating one embodiment of a radio-based sensing-sensing slot containing a radio-based sensing transmission symbol and a set of radio-based sensing reception symbols.

Index 3 in Table 2 represents the case when using very high SCS to generate very short symbols in order to emulate the pulse-based radio-based sensing system, where the echo is received between the pulses. The UE is either semi-statically configured or dynamically indicated with symbols for RR and RT in radio-based sensing slots, such that these symbols follow a configured pattern, where for example one RT symbol for transmitting the radio-based sensing signal is followed with multiple RR symbols for receiving the echo of the same signal. The number of the continuous RR symbols is configured based on the required maximum range for sensing as illustrated in FIG. 5.

In one implementation, a UE is configured with a mapping table, where single or multiple waveforms are specified for radio-based sensing, for different frequency ranges and bandwidths. For example, at high frequency ranges, for instance at 70 GHz) and with large bandwidth available, e.g., 2 GHz, code-modulated radio-based sensing waveforms can be utilized while at the same frequency with lower bandwidths, e.g., 400 MHz, CP-OFDM can be employed for radio-based sensing.

In another implementation, a mapping table indicating different frequency ranges and SCSs with corresponding waveforms is pre-configured. An example of such mapping table is illustrated in Table 3.

TABLE 3

Mapping between SCS, frequency range, and radio-based sensing waveform type

| Index | Frequency range | SCSs | Waveform |
|---|---|---|---|
| 0 | Up to 3GHZ | 15 kHz | FMCW |
| 1 | 3 GHz-6 GHZ | 15 kHz, 30 kHz | FMCW |
| 2 | 6 GHz-30 GHz) | 60 kHz | FMCW / CP OFDM |
| 3 | 6 GHz-30 GHz) | 120 kHz | CP-OFDM |
| 4 | 30 GHz-52 GHz | 60 kHz, 120 kHz | CP-OFDM |
| 5 | 52 GHz-71 GHz | 480 kHz | DFT-s-OFDM |
| 6 | 52 GHz-71 GHz | 480 kHz, 960 kHz | DFT-s-OFDM/FMCW |
| 7 | Beyond 71 GHz | 1920 kHz and higher | DFT-s-OFDM/ single carrier (pulses) |

FIG. 5 depicts for a radio-based sensing slot 500, according to embodiments of the disclosure. The depicted slot 500 includes seven OFDM symbols. The first and fifth symbols are used for radio-based sensing transmission ("RT") and the remaining symbols are used for radio-based sensing reception ("RR"). As noted above, the number of the continuous RR symbols is configured based on the required maximum range for sensing, i.e., three RR symbols as depicted.

Figure 6:
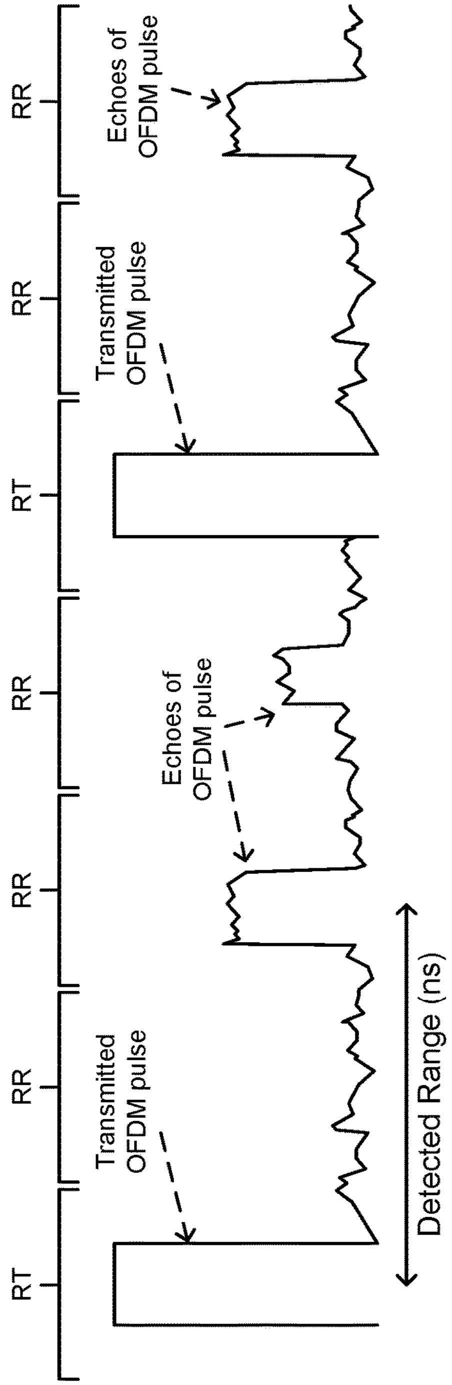
FIG. 6 is a diagram illustrating one embodiment of Orthogonal Frequency Division Multiplexing ("OFDM") pulse transmission and pulse echo reception corresponding to the slot of FIG. 5.

FIG. 6 is a diagram illustrating one embodiment of OFDM pulse transmission and pulse echo reception corresponding to the slot of FIG. 5. Here, a communication device (i.e., UE or TRP/gNB) transmits an OFDM pulse for radio-based sensing, i.e., in an RT symbol. In one (or more) of the RR symbols, the communication device receives echoes of the OFDM pulse.

In some embodiments, when a half-duplex mode is configured for radio-based sensing signals, i.e., a given node transmits a radio-based sensing signal at one time and receives an echo in a different time, then following combinations for radio-based sensing can be applied:

A. Single TRP/gNB-only sensing: Here, the gNB transmits radio-based sensing signal in time t and receive the echoes in time t+t1. In one embodiment, the transmission and reception happen in different time symbols.

B. TRP-assisted sensing: Here, one TRP transmit the radio-based sensing signal in time t and other TRPs receive the reflections/echoes in time t+t1. Coordination between the TRPs is expected to avoid collision with any other signals.

C. UE-assisted sensing: Here, the gNB transmits radio-based sensing signal in time t and configured one or multiple UE to receive reflections/echoes in time t+t1, where the configuration can be based on slot format indication.

D. UE-only sensing: Here, the gNB configures symbols and/or slots to one or multiple UEs for transmission of radio-based sensing signals and reception of echoes, where the transmission and reception happen in different time.

In some embodiments, when a full-duplex mode is configured for radio-based sensing signals, i.e., the same node is transmitting the radio-based sensing signal and receiving the corresponding echo in same time, then following combinations for radio-based sensing can be applied:

A. Single TRP/gNB-only sensing: Here, the gNB transmits radio-based sensing signal in time t and can receive at least some echoes from previous radio-based sensing signal or same signal at same time This could simply mean that the transmission and reception happen in same time symbol.

B. UE-only sensing: Here, the gNB configures symbols and/or slots to one or multiple UEs for transmission of radio-based sensing signals and corresponding reception of echoes, where the transmission and reception happen in same time, i.e., at least some echoes are received by UE at the same time when it is transmitting the radio-based sensing signal.

In some embodiments, a sub-symbol level half-duplex mode is applied, i.e., a part of the time symbol is used to transmit the radio-based sensing signal and some other part of the same time symbol is used to receive corresponding echoes of the radio-based sensing signal. Such mode may also be referred to as "near-full-duplex."

In some embodiments, radio-based sensing signal is transmitted using one or more beams to a UE to detect the blockage in each of the beams using the configuration mentioned in the first solution such that beams for the Control Resource Set ("CORESET") and PDSCH are (re) configured accordingly. In some embodiments, fixed slots within a frame can be configured to transmit/receive radio-based sensing signals such for example every 5th slot (depending upon SCS values). In some embodiments, the radio-based sensing signal transmission/reception can happen in certain slots/symbols before the PDCCH transmission.

In some embodiment, the radio-based sensing signal can be multicast transmission beam swept in each configured spatial direction/filter otherwise transmitted simultaneously in one or more beams based on the hardware capability. For the UE, the Quasi-Co-Location ("QCL") assumption is provided by the network for the transmission of radio-based sensing signal.

Regarding QCL assumptions, according to current specification, there is only one QCL type, i.e., qcl-typeD for spatial relation between the source RS and target RS. This means that only a single source to single target beam association can be established. However, as the frequency goes higher, the number of beams could become a lot higher, therefore, more coarse association could be considered to cover wider areas. Also, from Transmission Configuration Indicator ("TCI") indication point of view, there was enhancement in Rel-16 to indicate up to two TCI states corresponding to two TRPs. However, this is still quite limited when there could be possibly higher number of TRPs for Frequency Range #2 ("FR2", i.e., frequencies from 24.25 GHz to 52.6 GHz) and beyond.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location relationship between one or two downlink reference signals and the Demodulation Reference Signal ("DMRS") ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The UE receives an activation command used to map up to 8 TCI states to the codepoints of the DCI field 'Transmission Configuration Indication' in one Component Carrier and/or Downlink Bandwidth Part ("CC/DL BWP") or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

Figure 7:
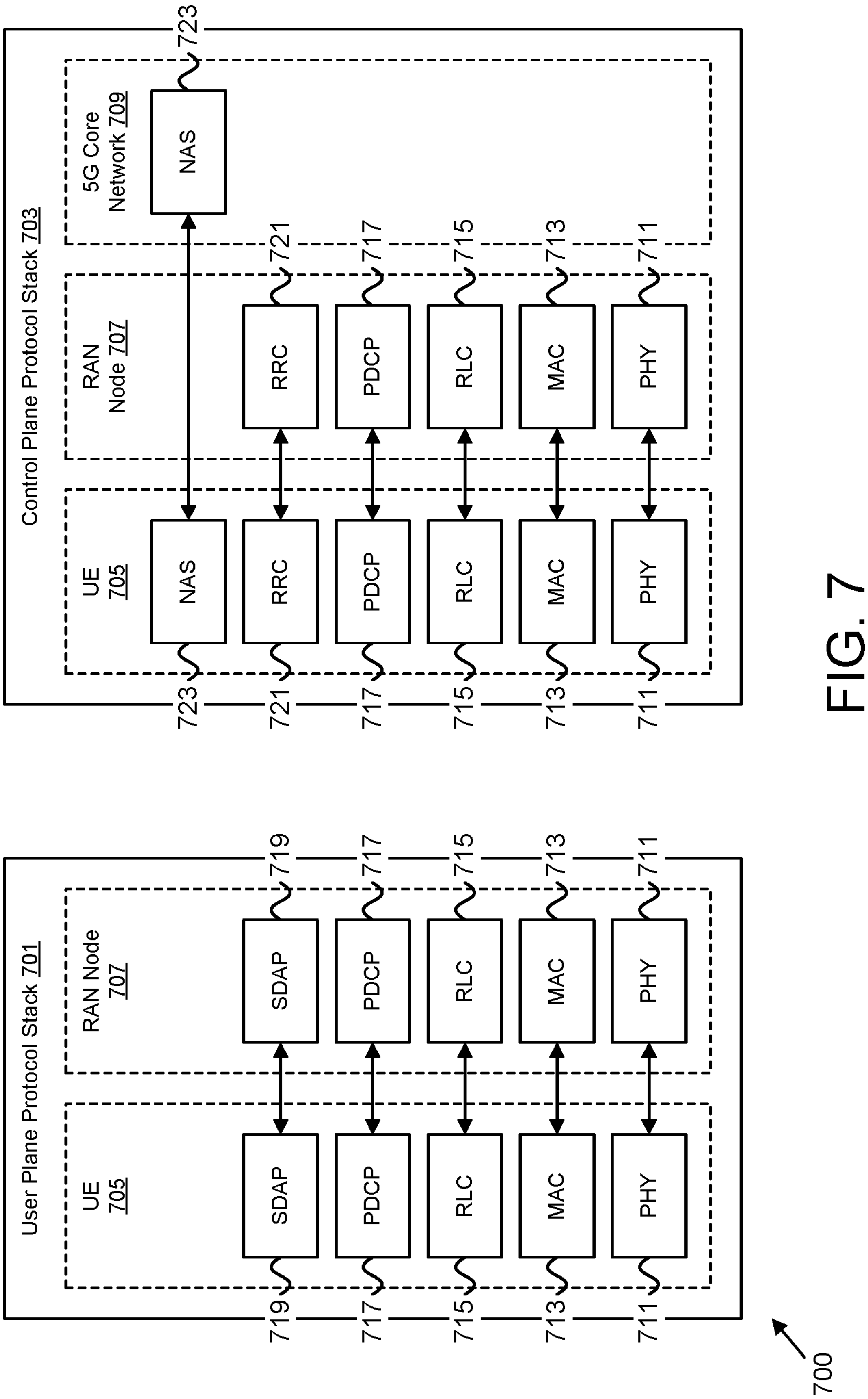
FIG. 7 is a diagram illustrating one embodiment of a New Radio ("NR") protocol stack.

FIG. 7 depicts a protocol stack 700, according to embodiments of the disclosure. While FIG. 7 shows a UE 705, a RAN node 707 and a 5G core network 709, these are representative of a set of remote units 105 interacting with a base unit 121 and a mobile core network 140. In one embodiment, the UE 705 is an embodiment of the UE-1 301, the UE-2 303 and/or the UE-3 305, while the RAN node 707 may be an embodiment of the gNB 310.

As depicted, the protocol stack 700 comprises a User Plane protocol stack 701 and a Control Plane protocol stack 703. The User Plane protocol stack 701 includes a physical ("PHY") layer 711, a Medium Access Control ("MAC") sublayer 713, the Radio Link Control ("RLC") sublayer 715, a Packet Data Convergence Protocol ("PDCP") sublayer 717, and Service Data Adaptation Protocol ("SDAP") layer 719. The Control Plane protocol stack 703 includes a physical layer 711, a MAC sublayer 713, a RLC sublayer 715, and a PDCP sublayer 717. The Control Place protocol stack 703 also includes a Radio Resource Control ("RRC") layer 721 and a Non-Access Stratum ("NAS") layer 723.

The AS layer (also referred to as "AS protocol stack") for the User Plane protocol stack 701 consists of at least SDAP, PDCP, RLC and MAC sublayers, and the physical layer. The AS layer for the Control Plane protocol stack 703 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 721 and the NAS layer 723 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 711 offers transport channels to the MAC sublayer 713, while the MAC sublayer 713 offers logical channels to the RLC sublayer 715. The RLC sublayer 715 offers RLC channels to the PDCP sublayer 717 and the PDCP sublayer 717 offers radio bearers to the SDAP sublayer 719 and/or RRC layer 721. The SDAP sublayer 719 offers QoS flows to the core network (e.g., 5G core network 709). The RRC layer 721 provides for the addition, modification, and release of Carrier Aggregation and/or Dual Connectivity. The RRC layer 721 also manages the establishment, configuration, maintenance, and release of Signaling Radio Bearers ("SRBs") and Data Radio Bearers ("DRBs").

Regarding beam management in NR, beam management is defined as a set of Layer 1/2 procedures (i.e., involving PHY layer 711 and MAC layer 713) to acquire and maintain a set of beam pair links, i.e., a beam used at transmit/receive point(s) ("TRP(s)") for RAN-side paired with a beam used at the UE. The beam pair links can be used for downlink ("DL") and uplink ("UL") transmission/reception. The beam management procedures include at least the following six aspects:

- Beam sweeping operation of covering a spatial area, with beams transmitted and/or received during a time interval in a predetermined way.
- Beam measurement: for the TRP(s) or the UE to measure characteristics of received beamformed ("BF") signals
- Beam reporting: for the UE to report information of BF signal(s) based on beam measurement
- Beam determination: for the TRP(s) or the UE to select of its own Tx/Rx beam(s)
- Beam maintenance: for the TRP(s) or the UE to maintain the candidate beams by beam tracking or refinement to adapt to the channel changes due to the UE movement or blockage.
- Beam recovery: for the UE to identify new candidate beam(s) after detecting beam failure and subsequently inform the TRP of beam recovery request with information of indicating the new candidate beam(s)

Figure 8:
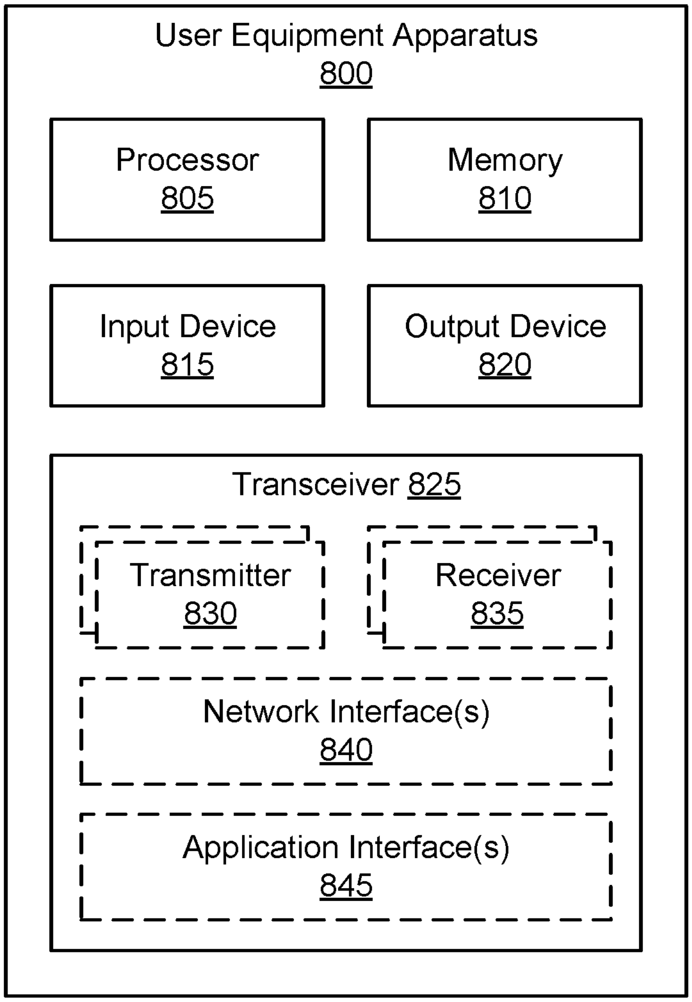
FIG. 8 is a block diagram illustrating one embodiment of a user equipment apparatus that may be used for radio-based sensing and joint communication.

FIG. 8 depicts a user equipment apparatus 800 that may be used for radio-based sensing and joint communication, according to embodiments of the disclosure. In various embodiments, the user equipment apparatus 800 is used to implement one or more of the solutions described above. The user equipment apparatus 800 may be one embodiment of the remote unit 105, the first UE 301, the second UE 303, the third UE 305, the UE 705, and/or the user equipment apparatus 800, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panels supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 controls the transceiver 825 to receive (e.g., via an air/radio interface) a first configuration from a RAN node, the first configuration including a TDD pattern with a set of (i.e., one or more) symbols for radio-based sensing and a set of (i.e., one or more) symbols for data/control channels (i.e., UL and/or DL channels). The processor 805 also receives a second configuration from the RAN node. Here, the second configuration may include: A) a waveform type indication; B) a SCS value (i.e., numerology); C) a carrier bandwidth (i.e., bandwidth part) for transmission and/or reception of radio-based sensing signals; or D) combinations thereof. Additionally, the processor 805 performs radio-based sensing according to the received configurations. In one embodiment, the processor 805 controls the transceiver 825 to transmit a radar signal and a data/control channel according to the received configurations.

In some embodiments, the first configuration is a dedicated configuration for a specific UE. In other embodiments, the first configuration is a common configuration for all UEs in a serving cell. Note that the first and second configurations may be sent using the same IEs or signaling messages. Alternatively, the first and second configurations may be sent using the separate IEs or signaling messages, i.e., using the same or different resources. In one embodiment, the first configuration and/or the second configuration may be dynamic configurations. In another embodiment, the first configuration and/or the second configuration may be semi-static configurations.

In some embodiments, the first configuration includes separate indications of a radio-based sensing symbol for reception at the apparatus 800 and a radio-based sensing symbol for transmission from the apparatus 800. In some embodiments, the apparatus 800 is capable of full-duplex communication and first configuration includes an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the processor 805 receives a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, the processor 805 transmits the radio-based sensing signal using a BWP activated for UL and/or DL communications. In certain embodiments, multiple BWP are activated for UL/DL communications and the second configuration does not indicate a separate BWP for radio-based sensing signals. In such embodiments, the processor 805 transmits the radio-based sensing signal using a BWP that is associated with a highest SCS.

In some embodiments, the indication of a waveform type comprises a mapping table that maps a waveform type for transmission/reception of a radio-based sensing signal to: A) a SCS value; or B) a frequency range value; or C) a carrier bandwidth size; or combinations thereof.

In some embodiments, the processor 805 applies a configured guard band gap when switching between a radio-based sensing symbol and a data/control channel symbol. In certain embodiments, the processor 805 receives a mapping between multiple values of guard band gaps and multiple values of SCS, where a SCS value configured for radio-based sensing signal is different than a SCS value configured for data/control channel.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to radio-based sensing and joint communication and/or mobile operation. For example, the memory 810 may store various parameters, panel/beam configurations, resource assignments, policies, and the like as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least one transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
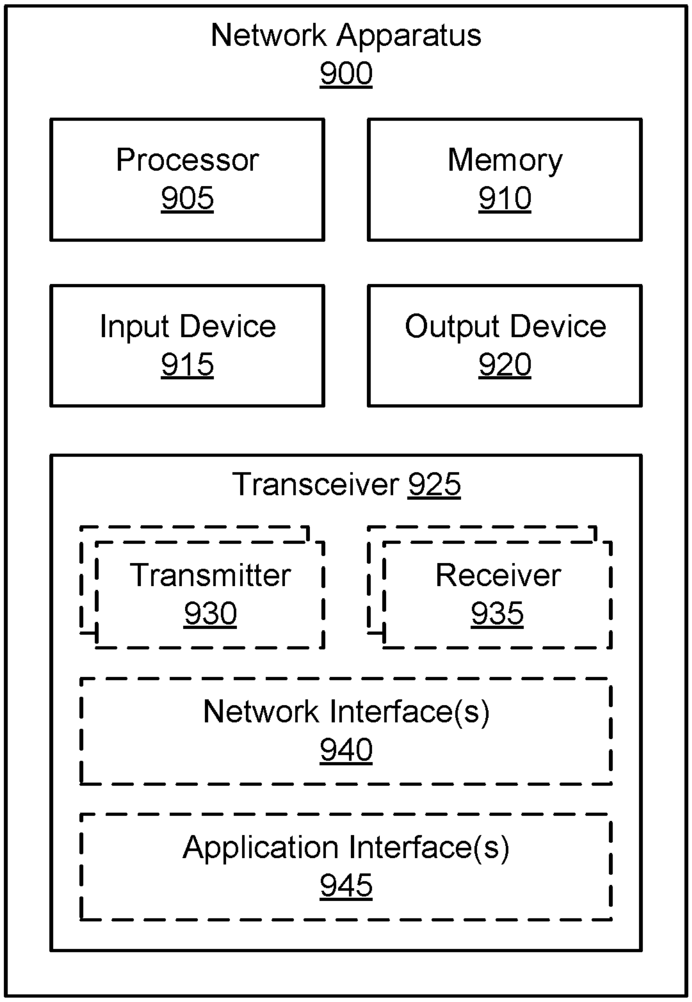
FIG. 9 is a block diagram illustrating one embodiment of a network apparatus that may be used for radio-based sensing and joint communication.

FIG. 9 depicts a network apparatus 900 that may be used for radio-based sensing and joint communication, according to embodiments of the disclosure. In one embodiment, network apparatus 900 may be one implementation of a RAN device, such as the base unit 121, the gNB 310, and/or the RAN node 710, as described above. Furthermore, the network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network apparatus 900 is a RAN node (e.g., gNB) that communicates with one or more UEs, as described herein. In such embodiments, the processor 905 controls the network apparatus 900 to perform the above described RAN behaviors. When operating as a RAN node, the processor 905 may include an application processor (also known as "main processor") which manages application-domain and operating system ("OS") functions and a baseband processor (also known as "baseband radio processor") which manages radio functions.

In various embodiments, the processor 905 controls the transceiver 925 825 to transmit (e.g., via an air/radio interface) a first configuration to a UE, where the first configuration includes a TDD pattern with a set of (i.e., one or more) symbols for radio-based sensing and a set of (i.e., one or more] symbols for data/control channels (i.e., downlink and/or uplink channels). The processor 905 transmits a second configuration to the UE. Here, the second configuration includes: A) a waveform type indication; B) a SCS value (i.e., numerology); C) a carrier bandwidth (i.e., a bandwidth part) for transmission and/or reception of radio-based sensing signals; or D) combinations thereof. Additionally, the processor 905 performs radio-based sensing according to the transmitted configurations. In one embodiment, the processor 905 controls the transceiver 925 to receive a radio-based sensing signal and a data/control channel according to the first and second configurations.

In some embodiments, the first configuration is a dedicated configuration for a specific UE. In other embodiments, the first configuration is a common configuration for all UEs in a serving cell. Note that the first and second configurations may be sent using the same IEs or signaling messages. Alternatively, the first and second configurations may be sent using the separate IEs or signaling messages, i.e., using the same or different resources. In one embodiment, the first configuration and/or the second configuration may be dynamic configurations. In another embodiment, the first configuration and/or the second configuration may be semi-static configurations.

In some embodiments, the first configuration includes separate indications of a radio-based sensing symbol for reception at the UE and a radio-based sensing symbol for transmission from the UE. In some embodiments, the UE is capable of full-duplex communication. In such embodiments, the first configuration may include an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the processor 905 configures a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, the radio-based sensing signal is received using a BWP activated for UL and/or DL communications. In certain embodiments, multiple BWP are activated for UL/DL communications and the second configuration does not indicate a separate BWP for radio-based sensing signals. In such embodiments, the radio-based sensing signal is received using a BWP that is associated with a highest SCS.

In some embodiments, the indication of a waveform type comprises a mapping table that maps a waveform type for transmission/reception of a radio-based sensing signal to: A) a SCS value; or B) a frequency range value; or C) a carrier bandwidth size; or D) combinations thereof.

In some embodiments, the first configuration includes a configured guard band gap between a radio-based sensing symbol and an adjacent data/control channel symbol. In certain embodiments, the processor 905 configures the UE with a mapping between multiple values of guard band gaps and multiple values of SCS, where a SCS value configured for radio-based sensing signal is different than a SCS value configured for data/control channel.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to radio-based sensing and joint communication and/or mobile operation. For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least one transmitter 930 and at least one receiver 935. One or more transmitters 930 may be used to communicate with the UE, as described herein. Similarly, one or more receivers 935 may be used to communicate with network functions in the Public Land Mobile Network ("PLMN") and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
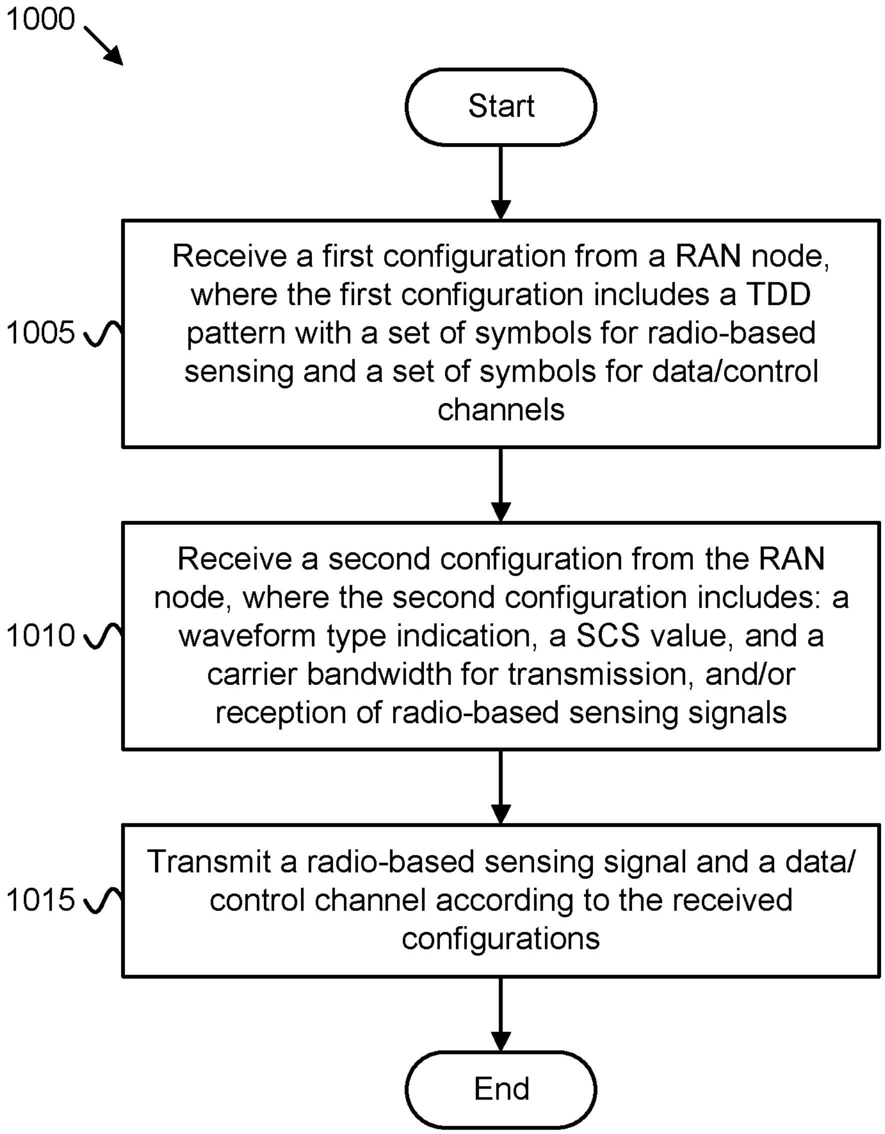
FIG. 10 is a flowchart diagram illustrating one embodiment of a first method for radio-based sensing and joint communication.

FIG. 10 depicts one embodiment of a method 1000 for radio-based sensing and joint communication, according to embodiments of the disclosure. In various embodiments, the method 1000 is performed by a UE device, such as the remote unit 105, the first UE 301, the second UE 303, the third UE 305, the UE 705, and/or the user equipment apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a first configuration from a RAN node, where the first configuration includes a TDD pattern with a set of (i.e., one or more) symbols for radio-based sensing and a set of (i.e., one or more) symbols for data/control channels (i.e., downlink and/or uplink channels). The method 1000 includes receiving 1010 a second configuration from the RAN node, where the second configuration includes: A) a waveform type indication, B) a SCS value (i.e., numerology), and/or C) a carrier bandwidth (i.e., a bandwidth part) for transmission and/or reception of radio-based sensing signals (e.g., radar signals). The method 1000 includes transmitting 1015 a radio-based sensing signal and a data/control channel according to the received configurations. The method 1000 ends.

Figure 11:
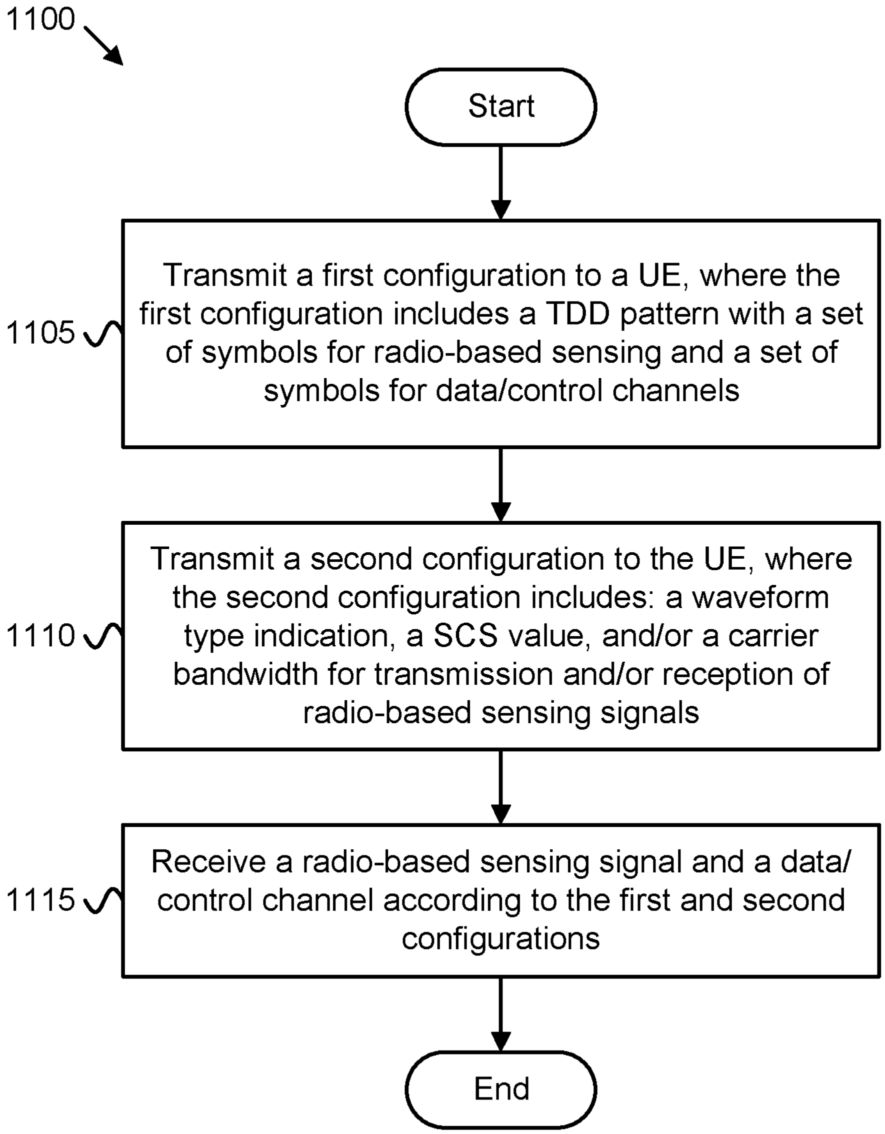
FIG. 11 is a flowchart diagram illustrating one embodiment of a second method for radio-based sensing and joint communication.

FIG. 11 depicts one embodiment of a method 1100 for radio-based sensing and joint communication, according to embodiments of the disclosure. In various embodiments, the method 1100 is performed by a RAN device, such as the base unit 121, the gNB 310, RAN node 710, and/or the network apparatus 900, described above as described above. In some embodiments, the method 1100 is performed by a processor, such as a microcontroller, a microprocessor, a CPU, a GPU, an auxiliary processing unit, a FPGA, or the like.

The method 1100 begins and transmits 1105 a first configuration to a UE, where the first configuration includes a TDD pattern with a set of (i.e., one or more) symbols for radio-based sensing and a set of (i.e., one or more) symbols for data/control channels (i.e., downlink and/or uplink channels). The method 1100 includes transmitting 1110 a second configuration to the UE, where the second configuration includes: A) a waveform type indication, B) a SCS value (i.e., numerology), and/or C) a carrier bandwidth (i.e., a bandwidth part) for transmission and/or reception of radio-based sensing signals (e.g., radar signals). The method 1100 includes receiving 1115 a radio-based sensing signal and a data/control channel according to the first and second configurations. The method 1100 ends.

Disclosed herein is a first apparatus for radio-based sensing and joint communication, according to embodiments of the disclosure. The first apparatus may be implemented by a UE device, such as the remote unit 105, the first UE 301, the second UE 303, the third UE 305, the UE 705, and/or the user equipment apparatus 800, described above. The first apparatus includes a transceiver and a processor that receives a first configuration from a RAN node, the first configuration including a TDD pattern with a set of (i.e., one or more) symbols for radio-based sensing and a set of (i.e., one or more) symbols for data/control channels (i.e., UL and/or DL channels). The processor also receives a second configuration from the RAN node, where the second configuration includes: a waveform type indication, a SCS value (i.e., numerology), a carrier bandwidth (i.e., a bandwidth part) for transmission and/or reception of radio-based sensing signals (e.g., radar signals), or combinations thereof. Additionally, the processor controls the transceiver to transmit a radio-based sensing signal and a data/control channel according to the received configurations.

In some embodiments, the first configuration is a dedicated configuration for a specific UE. In other embodiments, the first configuration is a common configuration for all UEs in a serving cell.

In some embodiments, the first configuration includes separate indications of a radio-based sensing symbol for reception at the first apparatus and a radio-based sensing symbol for transmission from the first apparatus. In some embodiments, the first apparatus is capable of full-duplex communication and first configuration includes an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the processor receives a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, the processor transmits the radio-based sensing signal using a BWP activated for UL and/or DL communications. In certain embodiments, multiple BWP are activated for UL/DL communications and the second configuration does not indicate a separate BWP for radio-based sensing signals. In such embodiments, the processor transmits the radio-based sensing signal using a BWP that is associated with a highest SCS.

In some embodiments, the indication of a waveform type comprises a mapping table that maps a waveform type for transmission/reception of a radio-based sensing signal to one or more of: A) a SCS value; B) a frequency range value; C) a carrier bandwidth size; or D) combinations thereof.

In some embodiments, the processor applies a configured guard band gap when switching between a radio-based sensing symbol and a data/control channel symbol. In certain embodiments, the processor receives a mapping between multiple values of guard band gaps and multiple values of SCS, where a SCS value configured for radio-based sensing signal is different than a SCS value configured for data/control channel.

Disclosed herein is a first method for radio-based sensing and joint communication, according to embodiments of the disclosure. The first method may be performed by a UE device, such as the remote unit 105, the first UE 301, the second UE 303, the third UE 305, the UE 705, and/or the user equipment apparatus 800, described above. The first method includes receiving a first configuration from a RAN node, where the first configuration includes a TDD pattern with a set of (i.e., one or more) symbols for radio-based sensing and a set of (i.e., one or more) symbols for data/control channels (i.e., downlink and/or uplink channels). The first method includes receiving a second configuration from the RAN node, where the second configuration includes at least one of: a waveform type indication, a SCS value (i.e., numerology), a carrier bandwidth (i.e., a bandwidth part) for transmission and/or reception of radio-based sensing signals (e.g., radar signals), or combinations thereof. The first method includes transmitting a radio-based sensing signal and a data/control channel according to the received configurations.

In some embodiments, the first configuration is a dedicated configuration for a specific UE. In other embodiments, the first configuration is a common configuration for all UEs in a serving cell.

In some embodiments, the first configuration includes separate indications of a radio-based sensing symbol for reception at the UE device and a radio-based sensing symbol for transmission from the UE device. In some embodiments, the UE device is capable of full-duplex communication. In such embodiments, the first configuration may include an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the processor receives a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, transmitting the radio-based sensing signal comprises using a BWP activated for UL and/or DL communications. In certain embodiments, multiple BWP are activated for UL/DL communications and the second configuration does not indicate a separate BWP for radio-based sensing signals. In such embodiments, transmitting the radio-based sensing signal includes using a BWP that is associated with a highest SCS.

In some embodiments, the indication of a waveform type comprises a mapping table that maps a waveform type for transmission/reception of a radio-based sensing signal to one or more of: A) a SCS value; B) a frequency range value; C) a carrier bandwidth size; or D) combinations thereof.

In some embodiments, the processor applies a configured guard band gap when switching between a radio-based sensing symbol and a data/control channel symbol. In certain embodiments, the processor receives a mapping between multiple values of guard band gaps and multiple values of SCS, where a SCS value configured for radio-based sensing signal is different than a SCS value configured for data/control channel.

Disclosed herein is a second apparatus for radio-based sensing and joint communication, according to embodiments of the disclosure. The second apparatus may be implemented by a RAN device, such as the base unit 121, the gNB 310, RAN node 710, and/or the network apparatus 900, described above. The second apparatus includes a transceiver and a processor that transmits a first configuration to a UE, where the first configuration includes a TDD pattern with a set of (i.e., one or more) symbols for radio-based sensing and a set of (i.e., one or more) symbols for data/control channels (i.e., downlink and/or uplink channels). The processor transmits a second configuration to the UE, where the second configuration includes at least one of: a waveform type indication, a SCS value (i.e., numerology), a carrier bandwidth (i.e., a bandwidth part) for transmission and/or reception of radio-based sensing signals (e.g., radar signals), or combinations thereof. Via the transceiver, the processor receives a radio-based sensing signal and a data/control channel according to the first and second configurations.

In some embodiments, the first configuration is a dedicated configuration for a specific UE. In other embodiments, the first configuration is a common configuration for all UEs in a serving cell.

In some embodiments, the first configuration includes separate indications of a radio-based sensing symbol for reception at the UE and a radio-based sensing symbol for transmission from the UE. In some embodiments, the UE is capable of full-duplex communication.

In such embodiments, the first configuration may include an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the processor configures a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, the radio-based sensing signal is received using a BWP activated for UL and/or DL communications. In certain embodiments, multiple BWP are activated for UL/DL communications and the second configuration does not indicate a separate BWP for radio-based sensing signals. In such embodiments, the radio-based sensing signal is received using a BWP that is associated with a highest SCS.

In some embodiments, the indication of a waveform type comprises a mapping table that maps a waveform type for transmission/reception of a radio-based sensing signal to one or more of: A) a SCS value; B) a frequency range value; C) a carrier bandwidth size; or D) combinations thereof.

In some embodiments, the first configuration includes a configured guard band gap between a radio-based sensing symbol and an adjacent data/control channel symbol. In certain embodiments, the processor configures the UE with a mapping between multiple values of guard band gaps and multiple values of SCS, where a SCS value configured for radio-based sensing signal is different than a SCS value configured for data/control channel.

Disclosed herein is a second method for radio-based sensing and joint communication, according to embodiments of the disclosure. The second method may be performed by a RAN device, such as the base unit 121, the gNB 310, RAN node 710, and/or the network apparatus 900, described above. The second method includes transmitting a first configuration to a UE, where the first configuration includes a TDD pattern with a set of (i.e., one or more) symbols for radio-based sensing and a set of (i.e., one or more) symbols for data/control channels (i.e., downlink and/or uplink channels). The second method includes transmitting a second configuration to the UE, where the second configuration includes at least one of: a waveform type indication, a SCS value (i.e., numerology), a carrier bandwidth (i.e., a bandwidth part) for transmission and/or reception of radio-based sensing signals (e.g., radar signals), or combinations thereof. The second method includes receiving a radio-based sensing signal and a data/control channel according to the first and second configurations.

In some embodiments, the first configuration is a dedicated configuration for a specific UE. In other embodiments, the first configuration is a common configuration for all UEs in a serving cell.

In some embodiments, the first configuration includes separate indications of a radio-based sensing symbol for reception at the UE and a radio-based sensing symbol for transmission from the UE. In some embodiments, the UE is capable of full-duplex communication. In such embodiments, the first configuration may include an indication of single type of radio-based sensing symbol to be used for concurrent transmission and reception of a radio-based sensing signal.

In some embodiments, the first configuration includes an indication of flexible type of radio-based sensing symbol that is to be separately indicated for a particular use selected from: downlink communication, uplink communication, radio-based sensing signal transmission, and radio-based sensing signal reception. In some embodiments, the second method includes transmitting a separate configuration indicating a radio-based sensing symbol that overrides the symbol type of the first configuration (i.e., where TDD pattern indicates a UL symbol, a DL symbol, or a flexible symbol).

In some embodiments, the second configuration indicates one or more of: a separate bandwidth part for radio-based sensing signals than used for data/control channels, and a separate SCS value for radio-based sensing signals than used for data/control channels.

In some embodiments, the second configuration does not indicate a separate BWP for radio-based sensing signals. In such embodiments, the radio-based sensing signal is received using a BWP activated for UL and/or DL communications. In certain embodiments, multiple BWP are activated for UL/DL communications and the second configuration does not indicate a separate BWP for radio-based sensing signals. In such embodiments, the radio-based sensing signal is received using a BWP that is associated with a highest SCS.

In some embodiments, the indication of a waveform type comprises a mapping table that maps a waveform type for transmission/reception of a radio-based sensing signal to one or more of: A) a SCS value; B) a frequency range value; C) a carrier bandwidth size; or D) combinations thereof.

In some embodiments, the first configuration includes a configured guard band gap between a radio-based sensing symbol and an adjacent data/control channel symbol. In certain embodiments, the second method includes transmitting, to the UE, a mapping between multiple values of guard band gaps and multiple values of SCS, where a SCS value configured for radio-based sensing signal is different than a SCS value configured for data/control channel.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:

receiving, from a base station, a first configuration comprising a time-division duplex ("TDD") pattern with a first set of symbols for radio-based sensing and a second set of symbols for data channels and control channels, wherein the first set of symbols comprises a first subset of symbols for radio-based sensing signal reception, a second subset of symbols for radio-based sensing signal transmission, and a third subset of symbols for concurrent transmission and reception of a radio-based sensing signal, wherein the second subset of symbols are different from the first subset of symbols, and wherein the third subset of symbols are different from the first subset of symbols and the second subset of symbols;

receiving, from the base station, a second configuration comprising one or more of:

a waveform type indication, a subcarrier spacing ("SCS") value, or a carrier bandwidth for transmission or reception of radio-based sensing signals;

transmitting the radio-based sensing signal according to the first configuration and the second configuration; and performing a data channel or a control channel transmission according to the first configuration and the second configuration.

2. The method of claim 1, wherein the first configuration comprises an indication of a radio-based sensing symbol that is to be separately indicated for a particular use selected from: downlink communication, uplink communication, radio-based sensing signal transmission, and radio-based sensing signal reception.

3. The method of claim 1, wherein the first configuration is a dedicated configuration for a specific UE.

4. The method of claim 1, wherein the first configuration is a common configuration for all UEs in a serving cell.

5. The method of claim 1, further comprising receiving a separate configuration indicating a radio-based sensing symbol that overrides a symbol type of the first configuration.

6. The method of claim 1, wherein the second configuration indicates one or more of: a first bandwidth part ("BWP") for transmission and reception of the radio-based sensing signals, a second BWP for transmission and reception of the data channels and control channels, a first SCS value for the radio-based sensing signals, or a second SCS value for the data channels and control channels.

7. The method of claim 1, wherein the second configuration lacks an indication of a separate bandwidth part ("BWP") for the radio-based sensing signals, and wherein transmitting the radio-based sensing signal comprises using a BWP activated for uplink and/or downlink ("UL/DL") communications.

8. The method of claim 7, wherein multiple BWP are activated for UL/DL communications, and wherein transmitting the radio-based sensing signal comprises using a BWP that is associated with a highest SCS value.

9. The method of claim 1, wherein the waveform type indication comprises a mapping table that maps a waveform type for transmission and reception of the radio-based sensing signals to one or more of: a SCS value, a frequency range value, or a carrier bandwidth size.

10. The method of claim 1, further comprising applying a configured guard band gap when switching between a symbol for the radio-based sensing and a symbol for the data channels and control channels.

11. The method of claim 10, further comprising receiving a mapping between multiple values of guard band gaps and multiple values of SCS, wherein a SCS value configured for the radio-based sensing signal is different than a SCS value configured for the data channel or the control channel transmission.

12. A user equipment ("UE") for wireless communication comprising:

at least one memory; and at least one processor coupled with the at least one memory and configured to cause the UE to:

receive, from a base station, a first configuration comprising a time-division duplex ("TDD") pattern with a first set of symbols for radio-based sensing and a second set of symbols for data channels and control channels, wherein the first set of symbols comprises a first subset of symbols for radio-based sensing signal reception, a second subset of symbols for radio-based sensing signal transmission, and a third subset of symbols for concurrent transmission and reception of a radio-based sensing signal, wherein the second subset of symbols are different from the first subset of symbols, and wherein the third subset of symbols are different from the first subset of symbols and the second subset of symbols;

receive from the base station, a second configuration comprising one or more of: a waveform type indication, a subcarrier spacing ("SCS") value, or a carrier bandwidth for transmission or reception of radio-based sensing signals;

transmit the radio-based sensing signal according to the first configuration and the second configuration; and perform a data channel or a control channel transmission according to the first configuration and the second configuration.

13. The UE of claim 12, wherein the first configuration comprises an indication of a radio-based sensing symbol that is to be separately indicated for a particular use selected from: downlink communication, uplink communication, radio-based sensing signal transmission, and radio-based sensing signal reception.

14. The UE of claim 12, wherein the first configuration is a dedicated configuration for a specific UE.

15. A base station for wireless communication, comprising:

at least one memory; and at least one processor coupled with the at least one memory and configured to cause the base station to:

transmit, to a user equipment ("UE") a first configuration comprising a time-division duplex ("TDD") pattern with a first set of symbols for radio-based sensing and a second set of symbols for data channels and control channels, wherein the first set of symbols comprises a first subset of symbols for radio-based sensing signal reception, and second subset of symbols for radio-based sensing signal transmission, and a third subset of symbols for concurrent transmission and reception of a radio-based sensing signal, wherein the second subset of symbols are different from the first subset of symbols, and wherein the third subset of symbols are different from the first subset of symbols and the second subset of symbols;

transmit, to the UE, a second configuration comprising one or more of: a waveform type indication, a subcarrier spacing ("SCS") value, or a carrier bandwidth for transmission or reception of radio-based sensing signals;

receive the radio-based sensing signal according to the first configuration and the second configuration; and receive a data channel or a control channel transmission according to the first configuration and the second configuration.

16. The base station of claim 15, wherein the first configuration comprises an indication of a radio-based sensing symbol that is to be separately indicated for a particular use selected from: downlink communication, uplink communication, radio-based sensing signal transmission, and radio-based sensing signal reception.

17. The base station of claim 15, further comprising receiving a separate configuration indicating a radio-based sensing symbol that overrides a symbol type of the first configuration.

18. The base station of claim 15, wherein the second configuration indicates one or more of: a bandwidth part ("BWP") for transmission and reception of the radio-based sensing signals, a second BWP for transmission and reception of the data channels and control channels, a first SCS value for the radio-based sensing signals, or a second SCS value for the data channels and control channels.

19. The base station of claim 15, wherein the second configuration lacks an indication of a separate bandwidth part ("BWP") for the radio-based sensing signals, and wherein transmitting the radio-based sensing signal comprises using a BWP activated for uplink and/or downlink ("UL/DL") communications.

20. The base station of claim 15, wherein the waveform type indication comprises a mapping table that maps a waveform type for transmission and reception of the radio-based sensing signals to one or more of: a SCS value, a frequency range value, or a carrier bandwidth size.

* * * * *